(12) United States Patent
Cassady et al.

(10) Patent No.: US 7,886,971 B2
(45) Date of Patent: Feb. 15, 2011

(54) AUTOMATED DRY CLEANING DELIVERY SYSTEM

(75) Inventors: Tony L. Cassady, Rindge, NH (US); William T. Epperson, Little Rock, AR (US); Eric L. Jones, North Little Rock, AR (US); Kevin J. Rowell, Maumelle, AR (US); James A. Faver, Little Rock, AR (US)

(73) Assignee: HMC Solutions, LLC, Maumelle, AR (US)

(*) Notice: Subject to any disclaimer, the term of this patent is extended or adjusted under 35 U.S.C. 154(b) by 50 days.

(21) Appl. No.: 12/455,565

(22) Filed: Jun. 3, 2009

(65) Prior Publication Data

US 2009/0302105 A1    Dec. 10, 2009

Related U.S. Application Data

(60) Provisional application No. 61/130,935, filed on Jun. 4, 2008.

(51) Int. Cl.
*G06K 15/00* (2006.01)

(52) U.S. Cl. ............ 235/383; 235/381; 235/385

(58) Field of Classification Search .......... 235/375, 235/381, 383, 385
See application file for complete search history.

(56) References Cited

U.S. PATENT DOCUMENTS

| | | | |
|---|---|---|---|
| 3,027,022 A | 3/1962 | Peras | |
| 3,478,316 A | 11/1969 | Block | |
| 4,550,246 A | 10/1985 | Markman | |
| 4,717,305 A * | 1/1988 | Edwards | 414/349 |
| 4,803,348 A * | 2/1989 | Lohrey et al. | 235/381 |
| 4,991,719 A | 2/1991 | Butcher | |
| 5,025,140 A | 6/1991 | Varley | |
| 5,493,107 A | 2/1996 | Gupta | |
| 5,509,572 A * | 4/1996 | Curtis | 221/76 |
| 5,563,958 A | 10/1996 | Higgins | |
| 5,581,064 A | 12/1996 | Riley | |
| 5,770,841 A | 6/1998 | Moed | |
| 5,794,213 A | 8/1998 | Markman | |
| 5,880,451 A | 3/1999 | Smith | |
| 5,880,541 A | 3/1999 | Hinds | |
| 5,962,834 A | 10/1999 | Markman | |
| 6,010,239 A * | 1/2000 | Hardgrave et al. | 700/213 |
| 6,578,671 B2 | 6/2003 | Shen | |
| 6,744,938 B1 | 6/2004 | Rantze et al. | |
| 6,832,726 B2 | 12/2004 | Torchalski | |
| 6,862,496 B2 * | 3/2005 | Fukuoka et al. | 700/237 |
| 6,882,269 B2 * | 4/2005 | Moreno | 340/5.73 |
| 7,108,171 B1 * | 9/2006 | Ergo et al. | 235/375 |
| 7,245,988 B1 * | 7/2007 | Terepka | 700/225 |
| 7,277,773 B2 * | 10/2007 | Speckhart et al. | 700/226 |
| 2005/0234869 A1 | 10/2005 | Massod | |
| 2007/0251990 A1 * | 11/2007 | LeNorman | 235/375 |

* cited by examiner

*Primary Examiner*—Thien M. Le
*Assistant Examiner*—Tuyen K Vo
(74) *Attorney, Agent, or Firm*—Stephen D. Carver

(57) ABSTRACT

An automated, self-service dry cleaning delivery system accepts and records items dropped off through a kiosk for cleaning, and returns cleaned items to the same kiosk for customer pick-up. A computer software program operates the conveyors, the loading doors, and material transporting equipment. To facilitate maximum customer satisfaction, numerous customer feedback choices are displayed to maximize system dexterity.

18 Claims, 21 Drawing Sheets

AUTOMATED DRY CLEANING DELIVERY SYSTEM

CROSS REFERENCE TO RELATED APPLICATION

This application is based upon, and claims the filing date of, prior U.S. Provisional application, Ser. No. 61/130,935, entitled "Automated Garment Storage Retrieval and Drop-Off System", filed Jun. 4, 2008.

BACKGROUND OF THE INVENTION

I. Field of the Invention

Our invention relates generally to automatic self service dry cleaning delivery systems. More particularly, the present invention relates to a software controlled, computerized dry cleaning drop-off and retrieval system that intelligently recognizes and processes inventory, and which provides a wide range of corrective measures that are user selectable to maintain accuracy and customer satisfaction.

II. Description of the Prior Art

While numerous partially automated dry cleaning systems exist, we are aware of no fully operational, self service dry cleaning drop-off and retrieval stations.

U.S. Pat. No. 5,581,064 issued Dec. 3, 1996 discloses a system for reading popular retail discount coupons. Identifying information can be derived with a bar code reader, an OCR scanner, a combination bar code reader/OCR scanner, or manual entry. The manufacturer's discount coupon has an alphanumeric identification of a particular item, a description and an amount by which to decrease the retail price of the item, an expiration date, and a U.P.C. (Universal Product Code), or other code, that identifies it. The system correlates the first identifying code with one or more second identifying codes, and chooses a particular one of the second identifying codes in uniquely identifying the coupon.

U.S. Pat. No. 6,832,726 issued Dec. 21, 2004 provides barcode optical character recognition software configured to create a printer format based on scanned labels. After an existing label is scanned, the software converts the scan into a label format through optical character recognition (OCR). The software recognizes and distinguishes text, graphics, and barcodes.

U.S. Pat. No. 5,880,451 issued Mar. 9, 1999 discloses an OCR processing system that reads human readable characters corresponding to an unsuccessfully decoded word in a bar code symbol. An imaging system captures an image of the label including its bar code symbol and corresponding human readable characters. If a bar code character is not successfully decoded, the system locates the associated human readable text and segments the text into individual character images. The unsuccessfully decoded bar code character is mapped to one or more of the alphanumeric character images, which are converted into text characters. The resulting ASCII data is used to create a substitute bar code character in the bar code symbology.

U.S. Pat. No. 6,744,938 issued Jun. 1, 2004 discloses a retail terminal with an imaging scanner that scans and reads labels to derive identifying product attributes. An attribute recognition program such as an optical character recognition (OCR) program is used on the scanned product label that generates text strings from alphanumeric label information and graphics images from graphics and logos. Text strings and/or graphics data are then compared to various text strings and graphics data in a database or look-up table to return information relative to the scan. Data, stored either locally or at a remote site accessible via a network or the like, is correlated to a plurality of text strings/graphics that correspond to alphanumeric text/graphics on a plurality of product labels.

U.S. Pat. No. 5,770,841 issued Jun. 23, 1998 discloses a scanner including an imaging system and a label decoding system. The imaging system captures an image of a package surface that includes a machine readable code such as a bar code and an alphanumeric destination address. The label decoding system locates and decodes the machine readable code and uses OCR techniques to read the destination address. The destination address is validated by comparing the decoded address to a database of valid addresses. If the decoded address is invalid, an image of the destination address is displayed on a workstation and an operator enters the correct address. The system forms a unified package record by combining the decoded bar code data and the correct destination address data. The unified package record is used for subsequently sorting and tracking the package and is stored in a database and applied to a label that is affixed to the package.

U.S. Pat. No. 4,550,246 issued Oct. 29, 1985 discloses an inventory control and reporting system for dry cleaning establishments. A data input keyboard provides information for analyzing processing costs of laundry articles, a data processor adapted to calculate pricing information and to generate reports based upon such data. Sequential bar code records and tags for attachment to the laundry articles are generated in sequential transactions. The bar code tags are attached to articles of clothing and are used with scanning apparatus to facilitate generation of reports according to various management needs.

U.S. Pat. No. 5,962,834 issued Oct. 5, 1999 discloses a tracking and management system designed especially for dry cleaning inventory control using RF encoding device and optical encoding. The optical pattern includes a barcode for automatic or semiautomatic data capture as well as human readable characters that are cross referenced to the RF identifying code and to inventory control records in a database. An identification packet is attached to each garment for tracking.

U.S. Pat. No. 4,803,348 issued to Lohrey, et al. on Feb. 7, 1989 involves an automated customer interface for services relating to drop-off and pickup at laundry and dry cleaning establishments. A customer's processed order is retrieved via a customer interface through a door which opens to enable the customer to pick up his order. Included in the customer interface panel are a card reader for reading the customer's credit card, a display for presenting information and instructions to the customer, a menu of services for selection by the customer and a keyboard or other input device to select desired services. A printer is included for printing a receipt and/or a transaction record.

SUMMARY OF THE INVENTION

This invention provides a self service dry cleaning drop-off and retrieval method and apparatus that responds with user-friendly computer prompts to maximize customer satisfaction. The apparatus recognizes and associates orders with particular customers, and subsequently delivers dry cleaned products in batches accessible at the kiosk.

Our automated, self-service dry cleaning delivery system described herein accepts orders of garments or items to be cleaned, and delivers them back to customers at a convenient kiosk. An upright kiosk has an access door for customers to drop off items for cleaning, or to pick up and retrieve items that have already been cleaned. A touch-screen monitor interface provides numerous customer options, and allows for user-friendly customer inputs. Payment transactions are facilitated with a card reader and a printer for customer receipts. Disposable bags are available from a convenient dispenser.

Clothing to be cleaned is bagged and put into a kiosk compartment by the customer at time of drop-off. A conveyor system with material handling apparatus stores and delivers cleaned garment orders to the kiosk at time of customer pick-up. Barcode scans, or alternatively RFID or OCR scans or manual entry, provide inventory control. A customer user interface program runs on a computer with a touch screen monitor mounted on the kiosk.

Thus a basic object is to provide a fully automated, computerized self service dry cleaning delivery system.

A related object is to provide a user-friendly, computerized self service dry cleaning delivery system of the character described that maximizes customer convenience and satisfaction.

Another object of the invention is to provide a self service dry cleaning delivery system of the character described with an inventory tracking system to maximize product delivery efficiency.

Another object of the invention is to provide a self service dry cleaning delivery system of the character described with security features that assure no customer gains access to any items other than their own.

Another object of the invention is to provide a self service dry cleaning delivery system of the character described that allows customers to return cleaned items through the kiosk to be re-hung on a storage conveyor or rack so as not to require re-cleaning.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

According to the invention, an automated self-service dry cleaning delivery system seen generally in FIGS. 1-6 and 19 provides customers with fully automatic, unattended dry cleaning drop-off and retrieval services. When installed within a staffed dry cleaning store, the system will deliver cleaned customer orders to the kiosk 10 when requested by a customer using the kiosk, and it will also deliver cleaned customer orders to a position on the conveyor accessible by a customer service representative (CSR) when requested by the CSR through a point-of-sale (POS) terminal located behind a customer service counter. The system design allows clothes items to be dropped-off and picked-up through the same kiosk door and compartment. This results in a space savings versus systems using one point for customer pick-up and another area for customer drop-off.

The system operates independently of an outside Point of Sale (POS) system, other than obtaining data records used to identify customers and their orders. Data is dumped from a POS into the database, then the system accesses only it's own database during operation. This allows the system to operate without the need for any continuous communication with another system.

This invention incorporates certain technology presented in a co-pending Utility Patent Application, entitled Automated Dry Cleaning Assembly Conveyor System, Ser. No. 11/801,728, filed May 10, 2007, which is hereby incorporated by reference.

Figure 1:
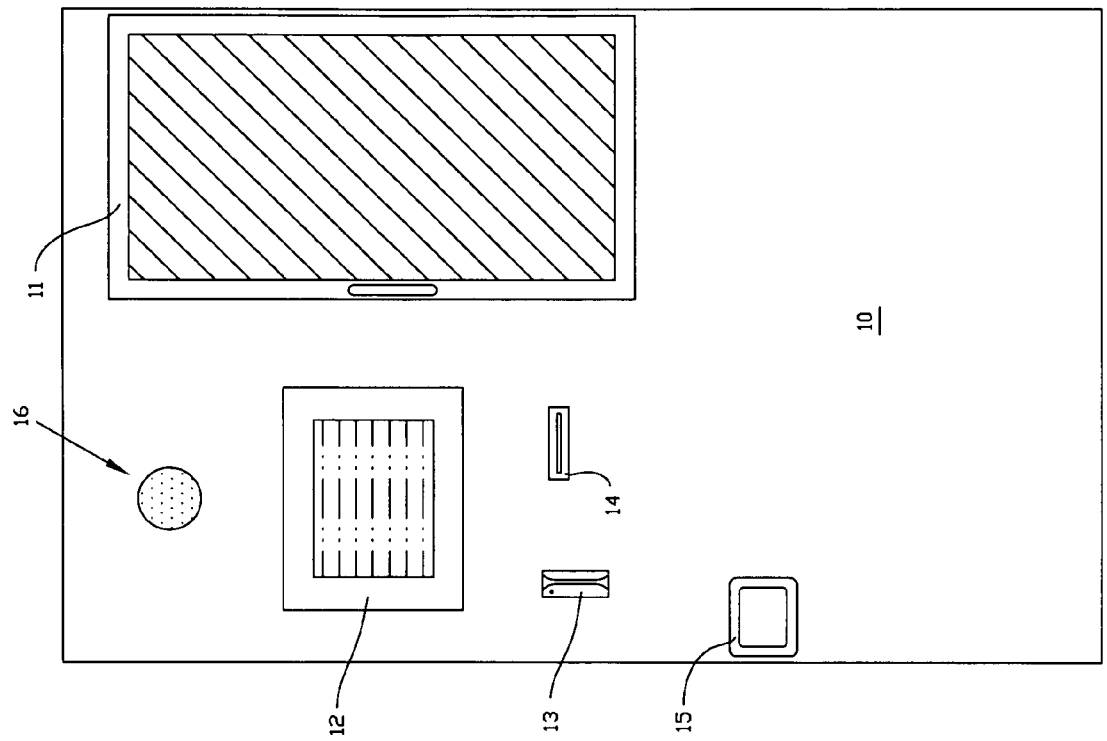
FIG. 1 is a front plan view of the preferred customer kiosk.

With initial reference directed now to FIG. 1 of the appended drawings, the upright, kiosk 10 generally in the form of a parallelepiped is disposed within an area or facility providing high visibility and easy ingress and egress to consumers, i.e., actual or potential dry cleaning customers. Front door 11 allows the customer to drop off items for cleaning, or to pick up and retrieve items that have already been cleaned. Operations are self service, and customer preferences are inputted via a touch-screen monitor interface generally designated by the reference numeral 12. For payment transactions and customer identification there is a magnetic card reader 13 adjacent a thermal printer 14 that outputs customer receipts. For customer convenience, disposable bags are available from dispenser 15. The system incorporates the built-in garment bag dispenser in order to provide a bag to any customer who drops off clothes and does not already have a bag. The bag dispenser apparatus 15 is located inside of the kiosk so that bags can only be accessed upon being dispensed after customer has been identified and has requested a bag. Audio feedback is provided to assist customers through speaker 16. All instructions are provided to customers both visually through text on the kiosk monitor and audibly through voice prompts via the kiosk speaker.

The system is modular so that the kiosk cabinet may be located at most any point along the storage conveyor (along one side or at the nose end). This allows for almost unlimited configuration options so the system may be installed in a large variety of spaces. The kiosk cabinet is designed so that it can be installed through a wall either on the exterior of a building, or into a lobby or vestibule area inside a building. All components on the front of the kiosk cabinet are sealed and weather resistant.

Figure 2:
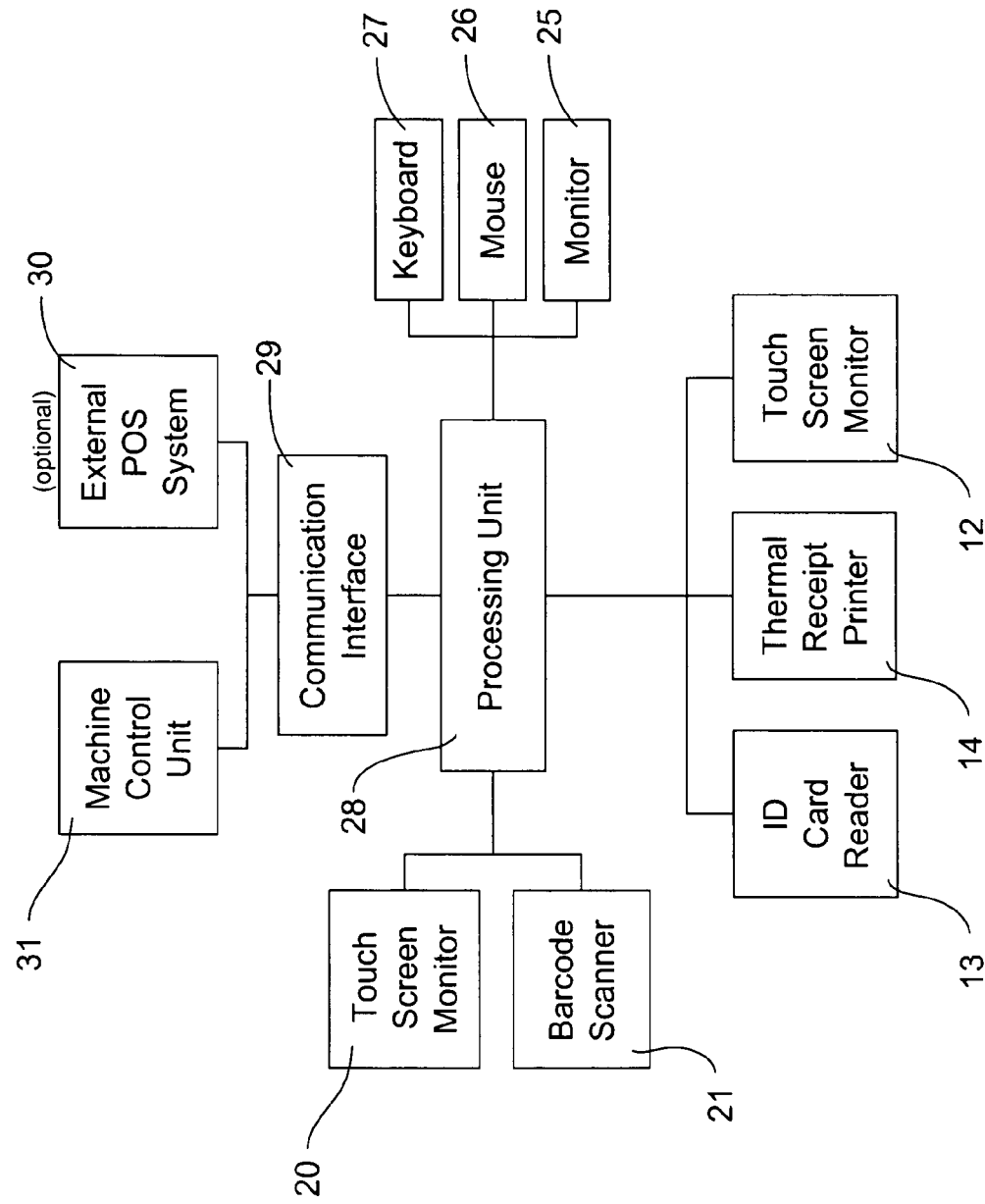
FIG. 2 is a diagrammatic block diagram of the preferred customers interfacing and computer portions of our invention.

The system is represented diagrammatically in FIG. 2. Touch screen monitor 20 and the barcode canner 21 allow operator inputs to the processing unit 28 during the order loading process. Identification card reader electronics 13, a thermal receipt printer circuit 14, and the touch screen monitor interface 12 likewise communicate with the processing unit 28. A diagnostic monitor 25, a mouse 26, and a keyboard 27 aid operator information input and diagnostics, and these units also interface with processing unit 28. A PLC machine control unit 31 and an optional external "point of sale" (i.e., "POS") system 30 communicate with the processing unit 28 via communication interface 29, which ideally communicates locally through Ethernet communications, and which may communicate externally of the system through the Internet. An advantage of our system is that the processing unit 28 is provided by an inexpensive personal computer that runs the software to be hereinafter described.

Figure 3:
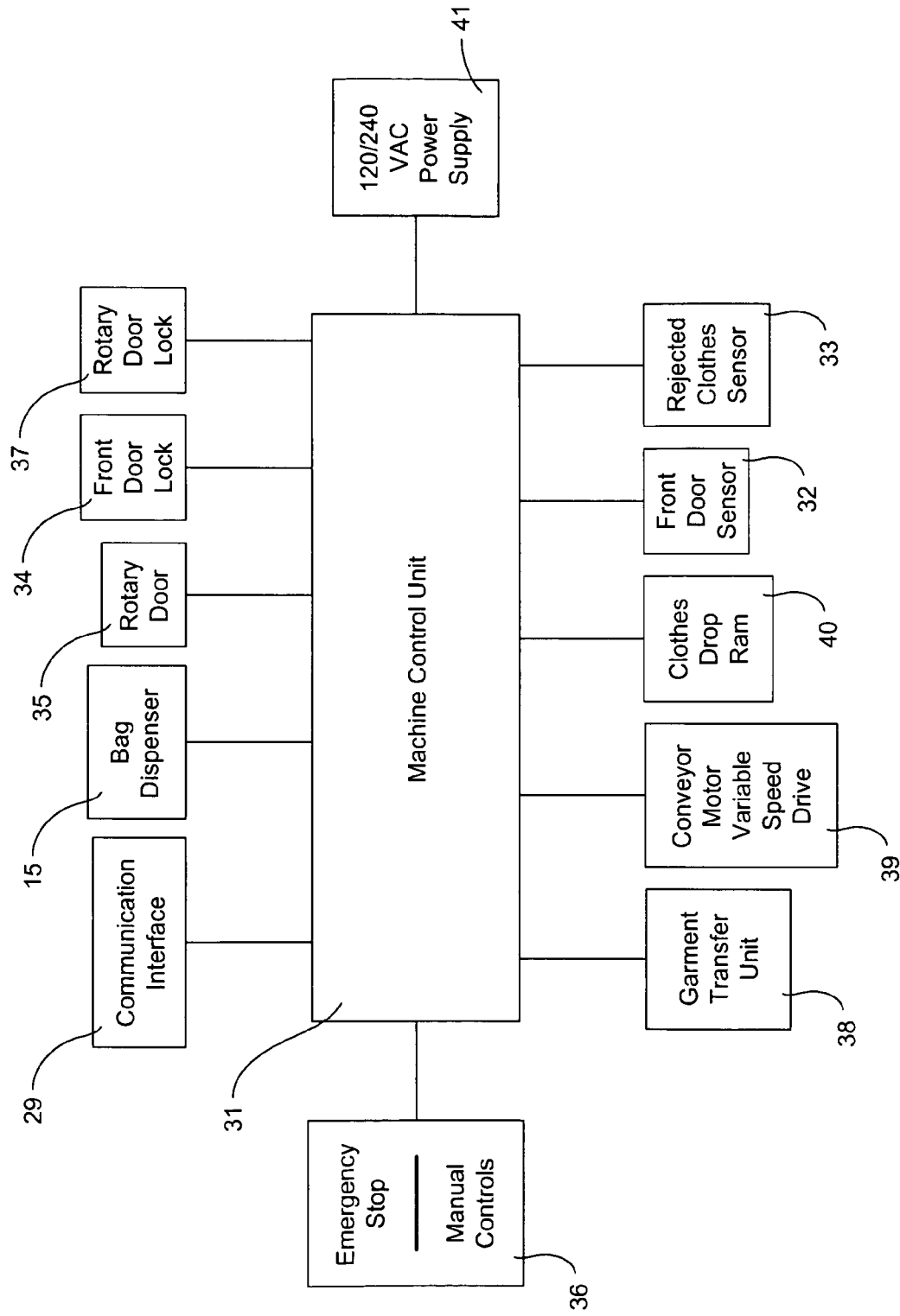
FIG. 3 is a block diagram of the machine control and hardware of the present invention.
Figure 6:
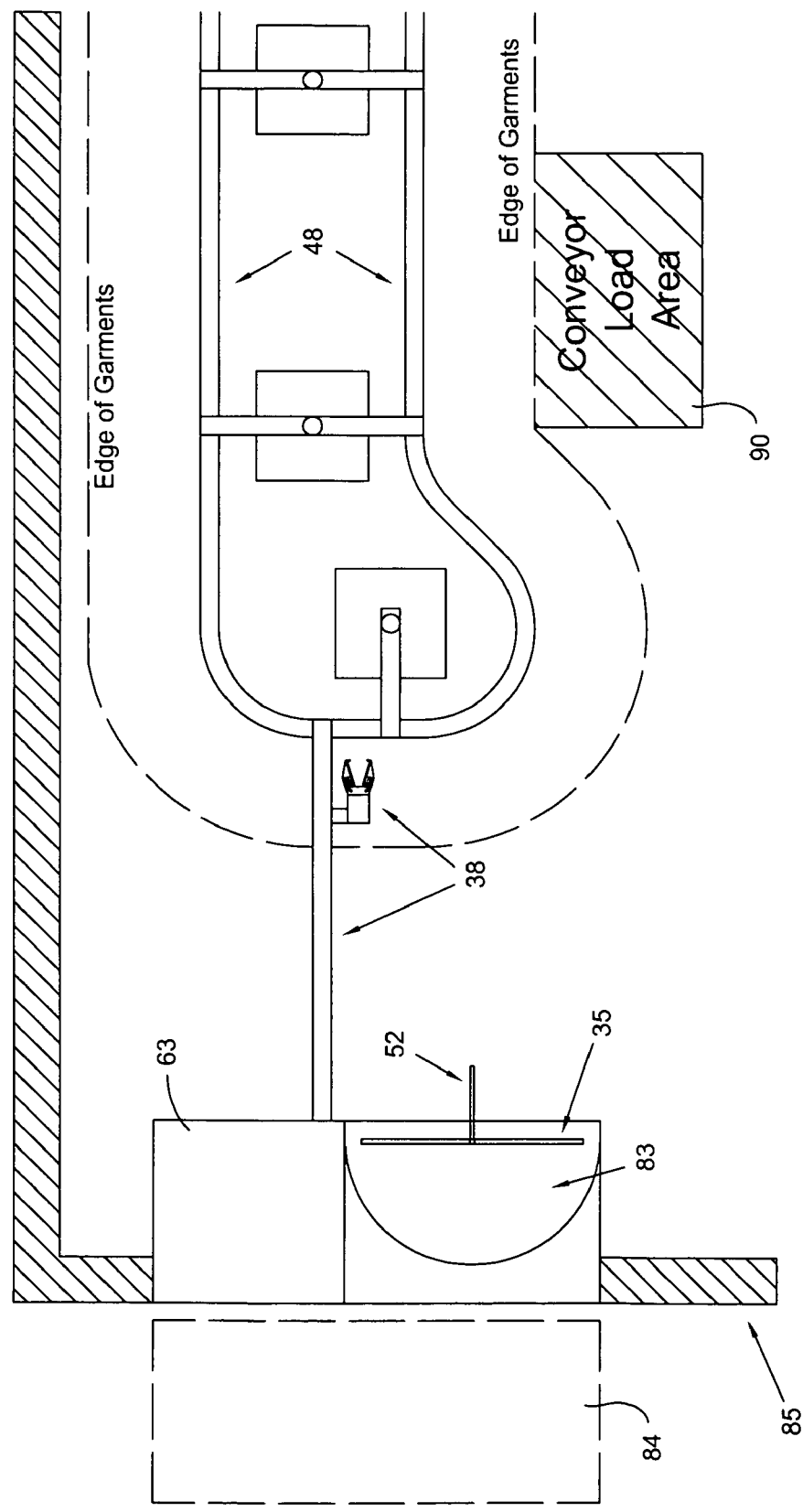
FIG. 6 is a fragmentary diagrammatic overhead view of the dry cleaning delivery system.

In FIG. 3, the machine control unit 31 processes inputs and outputs from the communication interface 29, the bag dispenser 15, front door lock 34 that locks front door 11 (FIG. 1), and rotary door lock 37 that locks an internal rotary door 35 (FIG. 6). Steps are included to insure that no customer has access to any clothing/order other than their own: Any time front door is unlocked, the rotary door is locked. Further, the rotary door 35 will not rotate when front door is open or unlocked.

Figure 5:
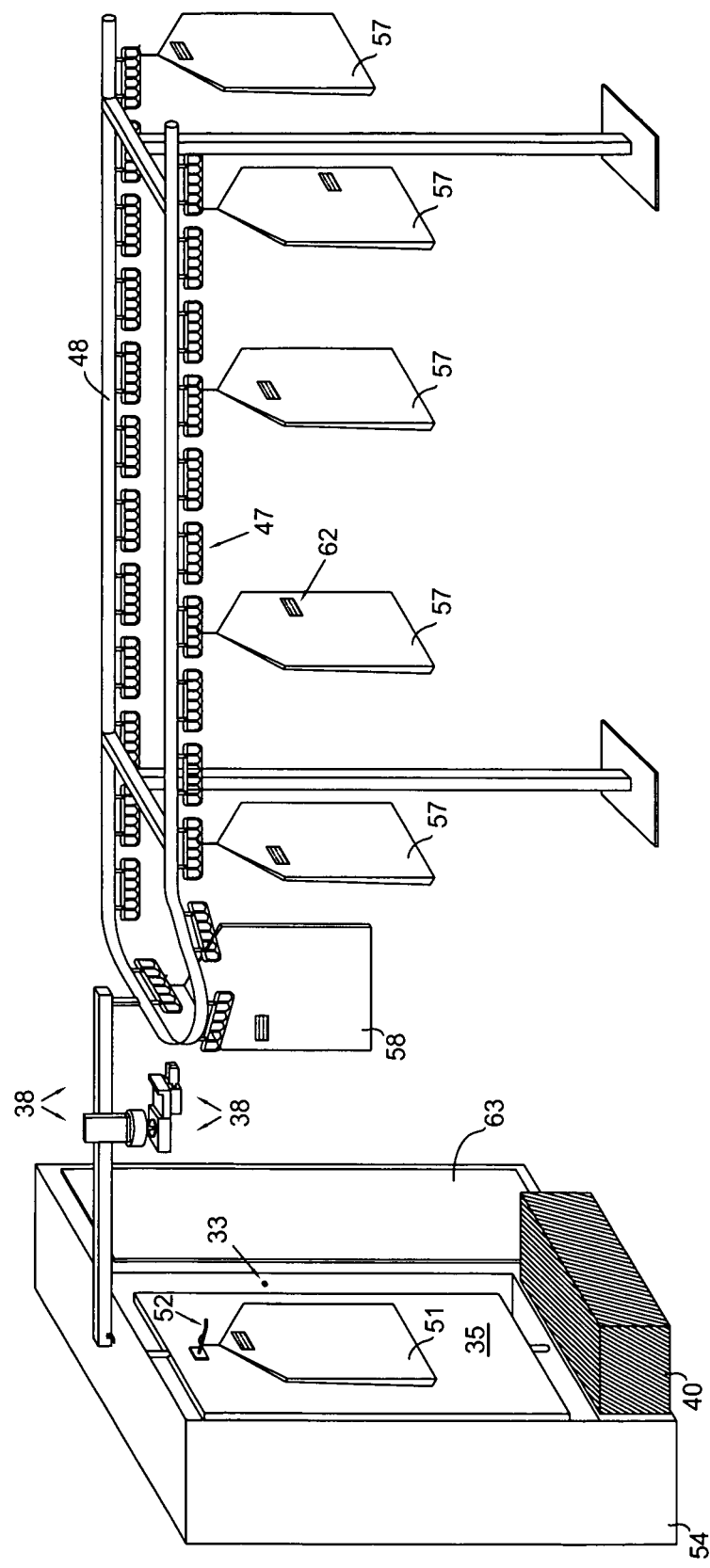
FIG. 5 is a fragmentary pictorial view of the dry cleaning delivery system.

Manual conveyor controls including an emergency stop function are designated generally by the reference numeral 36. Item handling apparatus includes the garment transfer unit 38, the conveyor motor control 39, and the clothes drop RAM 40. A front door sensor 32 detects whether the front door 11 (FIG. 1) is open or closed, and a rejected clothes sensor 33 detects presence of clothing on rotary door hook 52 (FIG. 5). Conventional power supply 41 supplies power.

The relatively large kiosk compartment used for both drop-off and pick-up allows for large and/or bulky items to be facilitated. Smooth surfaces and gaps between the rotary door 35 and surrounding kiosk surfaces allow for long dresses and other large items to be handled without the risk of snags or catching.

Figure 4:
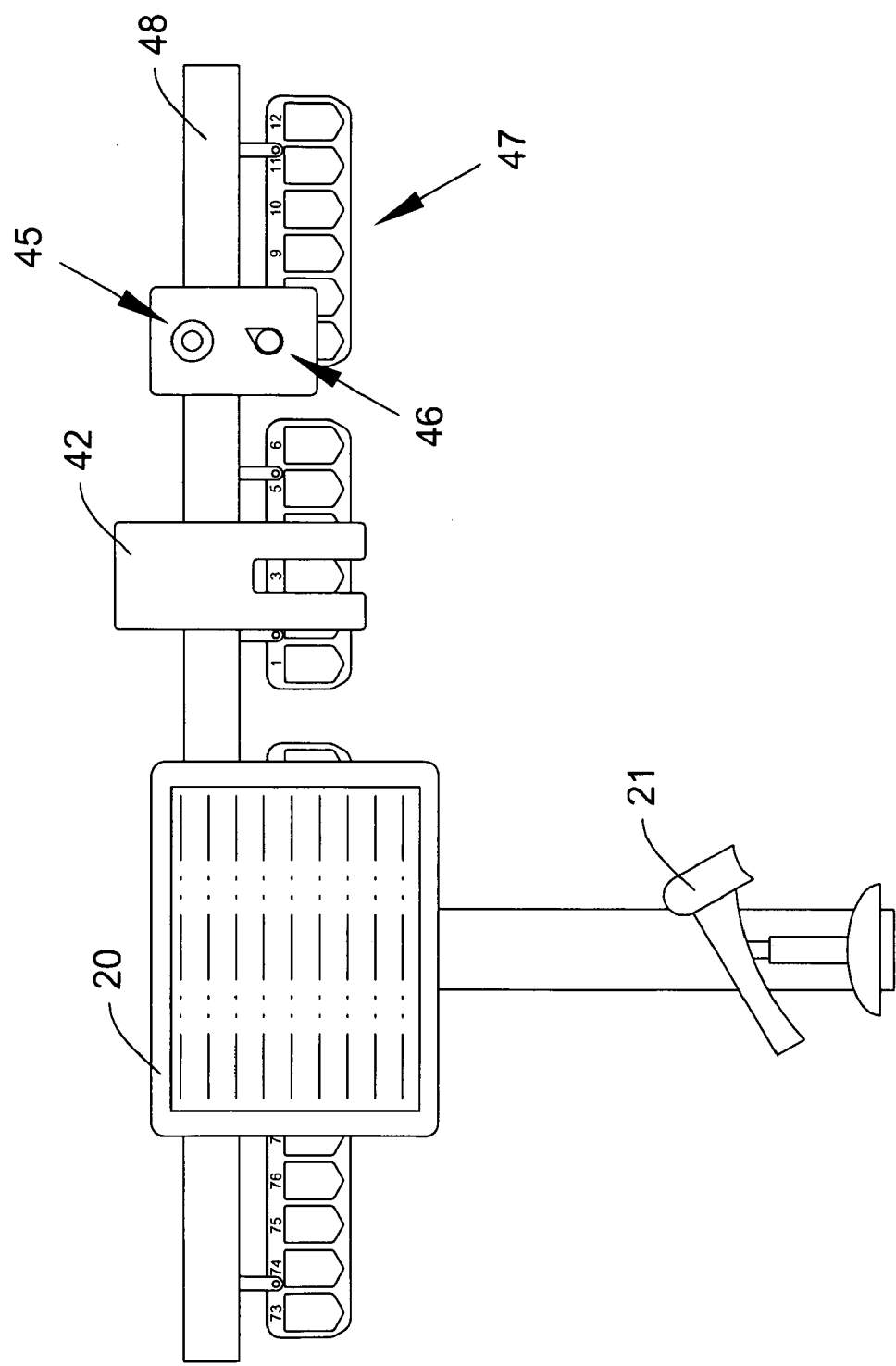
FIG. 4 is a schematic view of the preferred load station where an operator loads cleaned customer orders onto the system.

Turning to FIG. 4, cleaned customer orders are loaded onto the conveyor by an operator at loading shroud 42, and materials are moved by electric garment storage conveyor 48. This is monitored by the touch screen monitor 20, that also displays the barcode scans from scanner 21. Manual control of the conveyor is provided by manual control switch 46, that is located next to an emergency "STOP" button 45. A typical garment hanging bracket is designated by the reference numeral 47. Conveyor 48 controls a plurality of such spaced apart brackets 47.

In FIG. 5, the kiosk structure is designated by the reference numeral 54. Dirty clothes or other items to be cleaned are placed into the kiosk in a bag by a customer. For fast drop-off only, customers are given an "express drop-off" button on the touch screen monitor after swiping a card and entering their phone number for identification. This allows repeat customers to skip all screens related to order pick-up and item detail for drop-off for time savings.

Items dropped off are moved out of the kiosk by rotary door 35, then pushed clear of the rotary door by bag drop ram 40. Processed items (i.e., cleaned garments) 51 to be returned to the customer are temporarily suspended upon a delivery hook 52 attached to the rotary door 35.

Customers may return items with which they are not completely satisfied. The system asks customers at pick-up to examine their order and answer "yes" or "no" as to their satisfaction with the order. If they select "no", they are given the option to return any unsatisfactory items by hanging them back inside the kiosk. The items are then removed by the garment transfer unit and placed onto the conveyor. The rejected clothes sensor 33 (i.e., FIG. 3) detects if clothes are present on the delivery hook 52. In the event a customer forgets clothes they are picking up, and leaves them on the delivery hook (inside the kiosk) after the customer's transaction is completed, the garment transfer unit is activated to remove any such items from the delivery hook and place them back onto the conveyor prior to allowing the next customer access to the kiosk. Assignment and recording of the conveyor slot on which the items are hung allows the system to return the items when that customer returns to retrieve them again.

A mechanical garment transfer unit 38 is computer controlled for transferring items to and from the electric garment storage conveyor 48 and the delivery hook 52. Customer orders 57 disposed upon conventional clothes hangers are held by conveyor hanging brackets displaced by the storage conveyor 48. A customer order aligned to be picked up from the conveyor by the garment transfer unit is designated by the reference numeral 58. A computer and other controls are located within the machine controls cabinet 63 portion of the kiosk structure 54.

Each conveyor hanger bracket 47 is designed with an internal slots with a 'V' configuration. Each such "dip" in each hanger slot causes garment hangers to all gravitate toward the middle of the bracket slot (i.e., the bottom of the "V") assuring that the gripper fingers on the garment transfer unit can easily grip all hangers. This bracket design along with the garment transfer unit design prevent items from falling off the conveyor or being dropped during transfer from the conveyor to the kiosk.

Customers who have an order ready for pick-up, are given the option of either picking it up now or leaving it for pick-up later. This is useful for a customer who uses the system to drop off dirty clothes on their way to catch a train for a commute to work for example, but doesn't want to pick up cleaned orders until they return on their way home from work.

Each order has a unique identification number. This number is normally assigned and printed (usually in the form of a bar code) onto a paper invoice by the Point of Sale system. This invoice is then attached to each order and the bar code is then scanned by scanner 21 (FIG. 4) by moving the invoice in front of the scanner 21 at the load station. (Alternatively, an RFID chip and reader may be used, or alpha/numeric characters may be printed and read with an OCR reader for this step.) At this time the order information from the POS system has been received, and the system then references the order number in the database to find the customer information so that the order can be properly loaded onto the conveyor.

FIG. 6 schematically shows an overhead view of the floor plan for the equipment. The machine controls cabinet 63 is located near rotary door 35 that supports delivery hook 52. Dirty clothes are dropped by customers into cavity 83 which is spaced apart from kiosk usage or customer area 84 on the interior side of building wall 85. The garment transfer unit 38 is located between the electric garment storage conveyor 48 and the kiosk cabinet 10 (FIG. 1). The conveyor load area is generally designated by the reference numeral 90.

Figure 7:
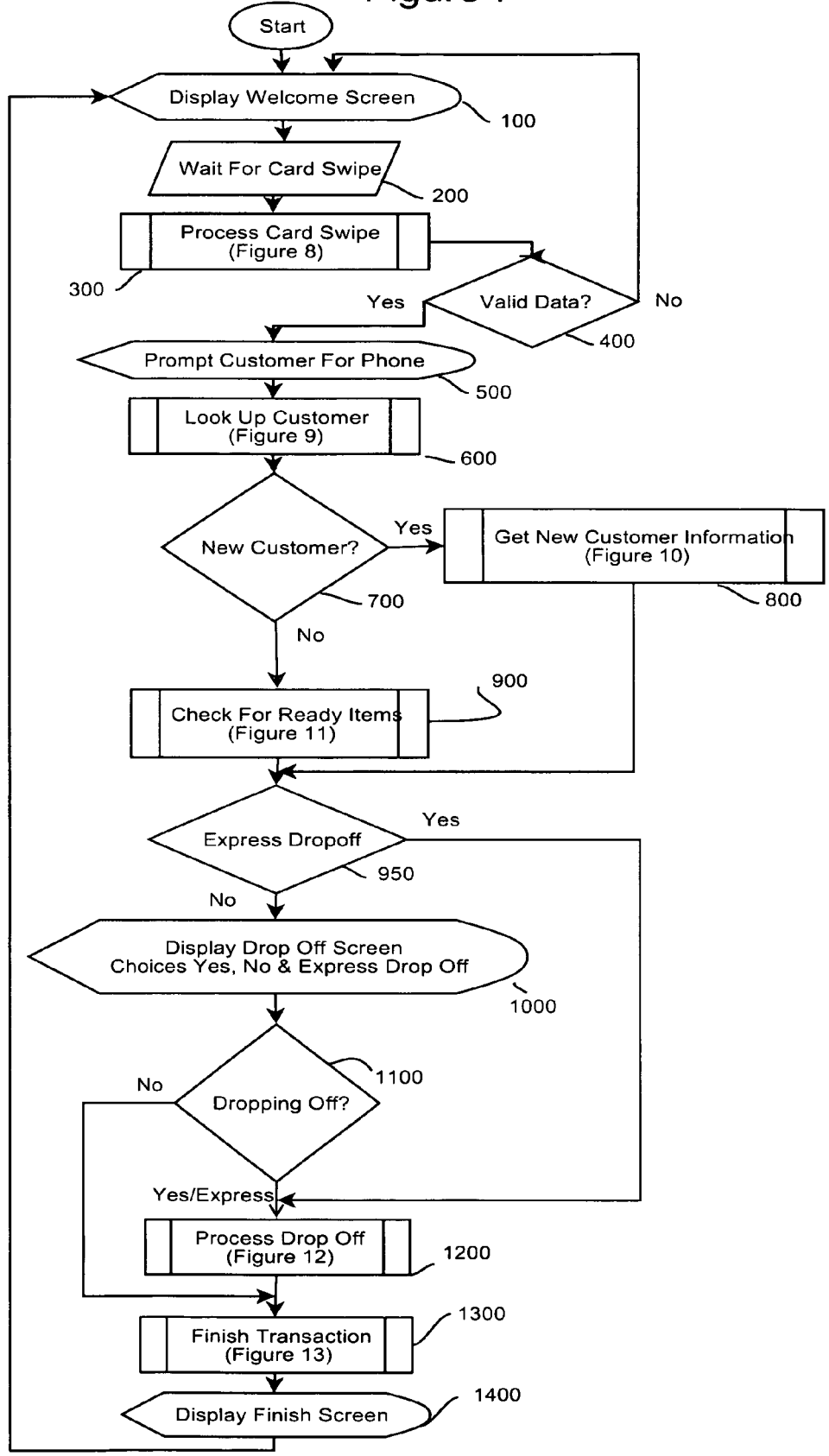
FIGS. 7-18 are flow charts of the preferred computer software executed by the invention.

Customer User Interface:

The customer user interface program of FIG. 7 runs on the primary computer whose display 12 (FIG. 1) is mounted proximate the front face of the kiosk 10 (FIG. 1). This display is touch screen enabled. Audio is provided through speaker system 16 (FIG. 1) also mounted on the front face of kiosk 10 (FIG. 1). All of the verbal instructions are dynamically generated using computer speech synthesis.

After the "start" function, the Display Welcome Screen step 100 executes, prompting the customer to press the start button on the computer touch screen or to swipe a magnetic card in the card reader 13 (FIG. 1).

The "Wait for card swipe" step 200 (FIG. 7), follows. At this time the computer monitors the magnetic card reader 13 waiting for a customer input. A Card Swipe is processed in step 300 wherein magnetic data is parsed and swipe is validated. This routine will return to the main program either a loyalty card number or the first and last name of the card holder, in the event the swiped card was a credit card.

Figure 8:
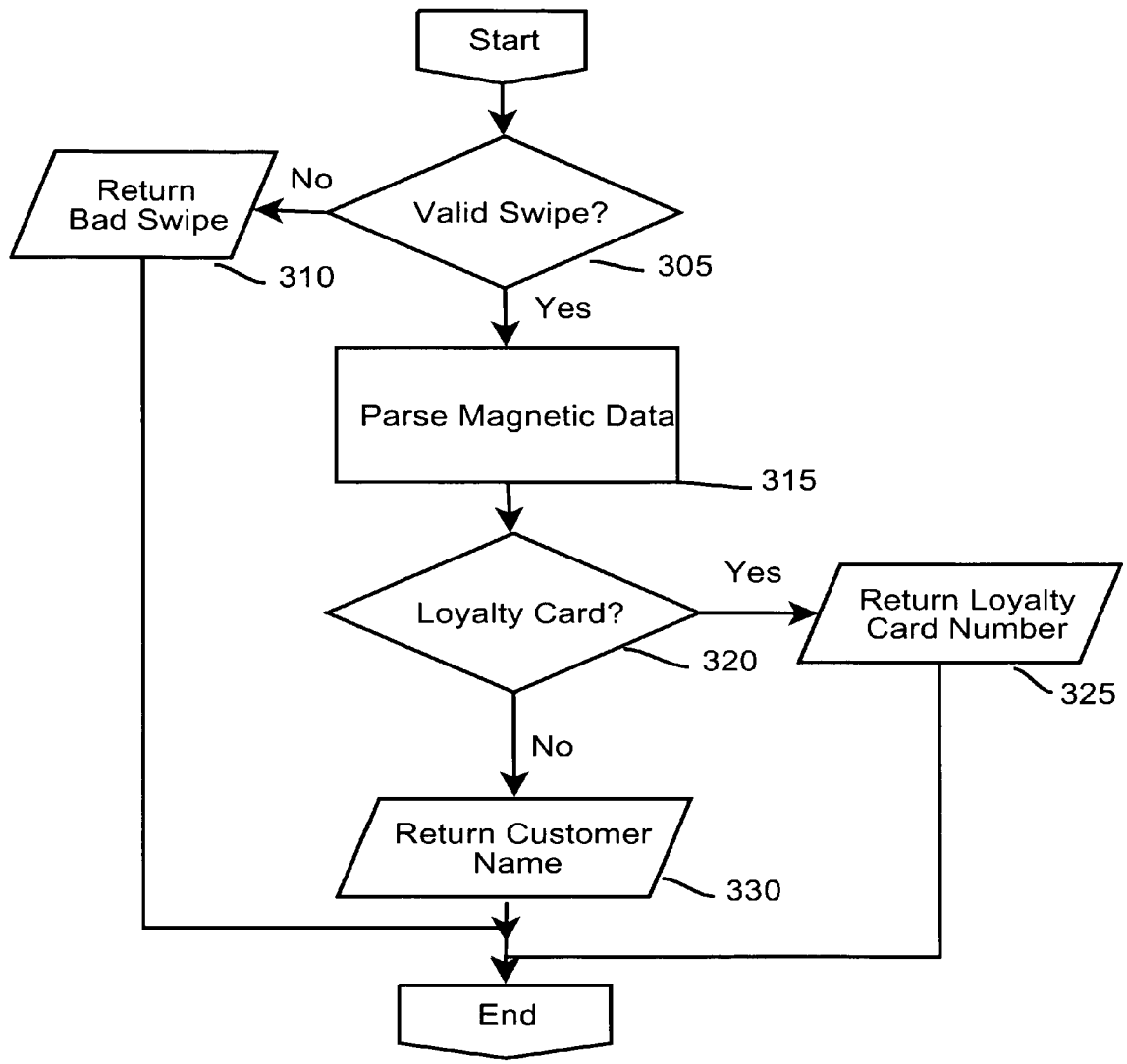

Referring to FIG. 8, the "Process Card Swipe" step 300 of FIG. 7 is detailed. Step 305 tests for a Valid Swipe, wherein magnetic track data is parsed from the reader to check for validity of the input. Invalid Swipe step 310 determines if magnetic card data was corrupt or in a format that was not compatible. An error condition is set and control is passed back to the customer user interface at 300. If the "valid swipe" step 305 (FIG. 8) is "yes", the Parse Magnetic Data step 315 executes. Track data is parsed for information including card number, expiration date and the card holder name.

Step 320 (FIG. 8) determines if a "loyalty card" is in use. The loyalty card is a custom branded card supplied by the assignee of this case, i.e., HMC Solutions LLC. The loyalty card contains a loyalty number that uniquely identifies a particular customer. A "yes" results in step 325, wherein the loyalty card number is stored, and control is passed back to the customer user interface at 300. If step 320 produces a negative, the "Return Customer Name" step 330 stores customer name data from the magnetic stripe and passes it back to the customer user interface at 300.

Returning again FIG. 7, the "Valid Data" step 400 follows the steps of FIG. 8, and the output of Process Card Swipe step 300 is checked for validity. If validity is negative, the process returns to the "Display Welcome Screen" step 100. If validity is yes, the "Prompt Customer For Phone" step 500 follows. In step 500 the screen on the kiosk displays a phone number entry screen and instructions for the customer to enter their phone number. In addition to the display, the instructions are read aloud through computer synthesized speech and broadcast on speaker 16 (FIG. 1). The customer enters their phone number and presses the continue button on the touch screen.

Figure 9:
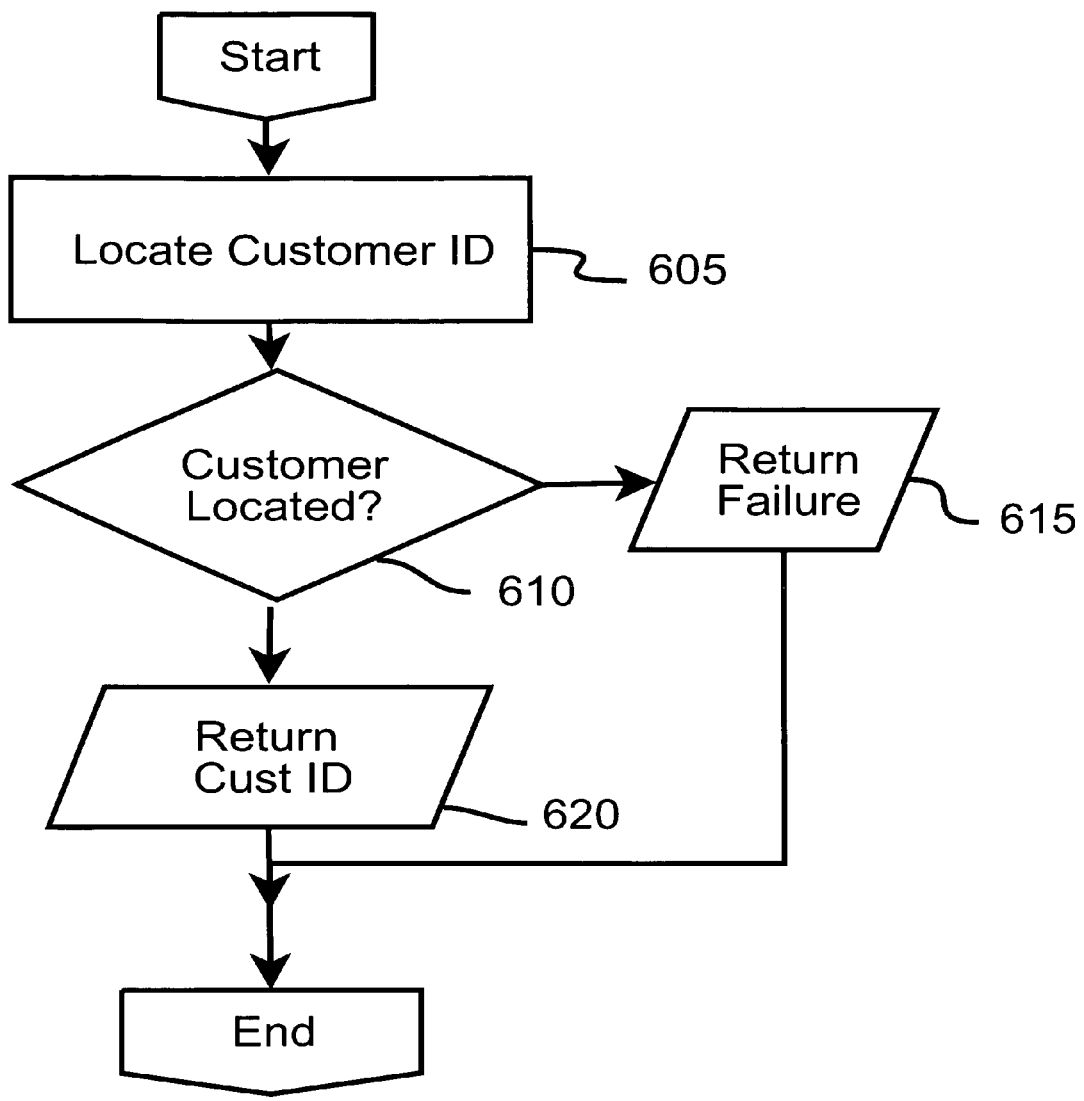

In the "Look Up Customer" step 600 the customer is looked up by matching the name field in the event of a credit card, or the loyalty number in the event of a loyalty card, obtained from step 300 with the phone number the customer entered in step 500. Referencing FIG. 9, step 600 is followed by the "Locate customer ID" step 605 wherein a customer table is queried with the phone number entered and customer name or loyalty number. The "Customer Locate" step 610 determines if a match was located in step 605. Step 615, the "no customer match" step, follows, returning to customer user interface step 600 (FIG. 7) if no customer ID is located. If a customer ID is found, "Customer found" step 620 uses a unique customer ID field to identify the correct customer to the system application, as well as third party software pertinent to the system and control is passed back to the customer interface step 600 (FIG. 7).

Figure 10:
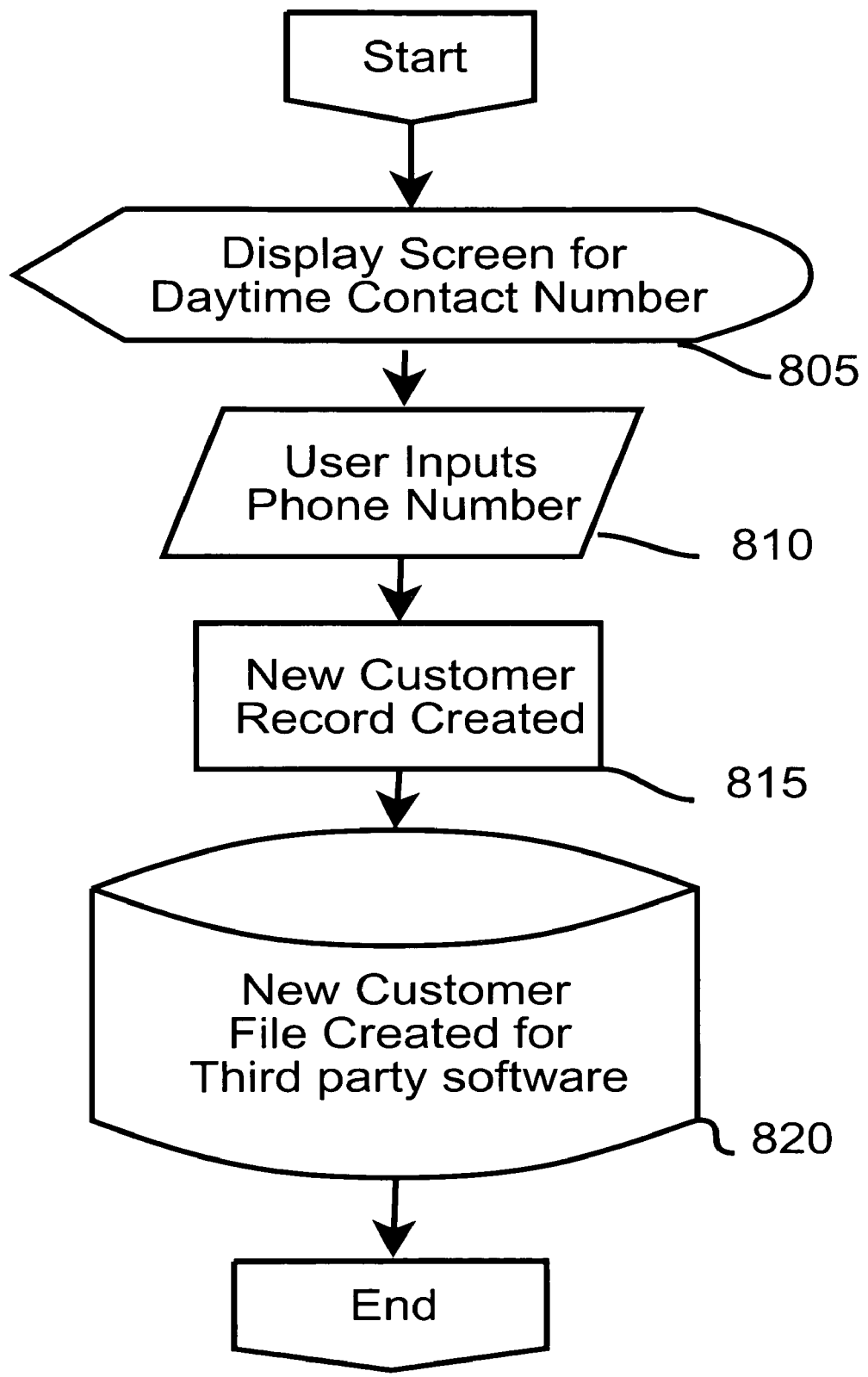

The "New Customer" step 700 (FIG. 7) proceeds if step 600 returns no customer ID. At this point the customer is presented with an option to set up a new account or enter a new phone number. The "Get New Customer Information" step 800 (FIG. 10) gathers information and creates a new customer record. The "Display screen for daytime contact number" step 805 (FIG. 10) causes the front kiosk screen to display instructions for the customer to enter a daytime phone number using the touch screen interface 12 (FIG. 1). The instructions are also read to the customer via synthesized computer voice over speaker 16. In the following "User Inputs Phone Number" step 810 (FIG. 10) the customer enters a daytime contact number for an employee to contact them and set up their profile, via the touch screen interface 12. When the phone number is entered the customer selects "continue" on the touch screen 12, and the "New Customer Record Created" step 815 creates a record in the new customer table based on information from the customers magnetic card data gathered in step 300 (FIG. 7) and phone number entered in step 810. Then the "New customer file created for third party software" step 820 creates a file and passes it to a third party software point of sale system, in a format that has been pre-agreed upon.

Figure 11:
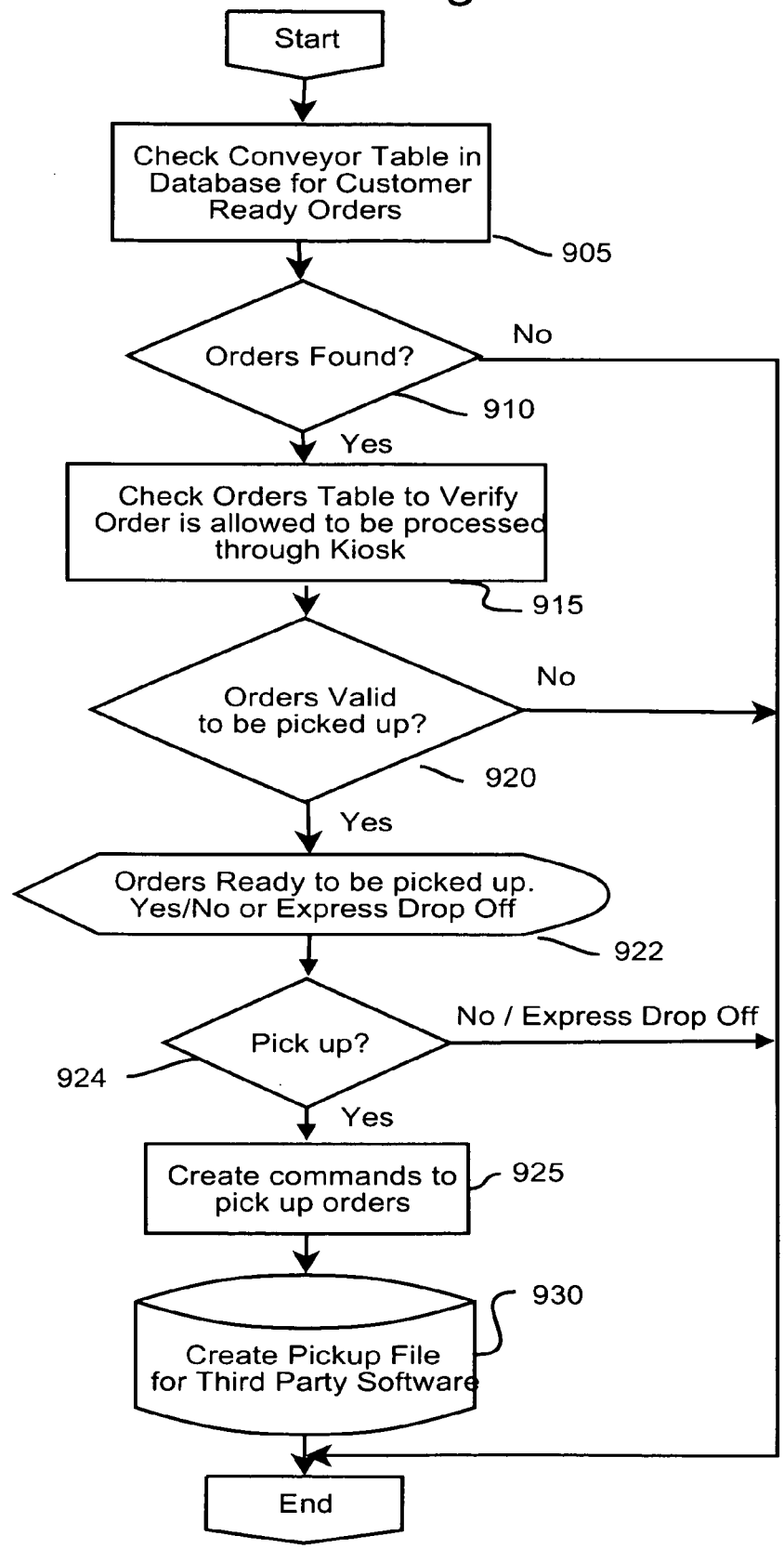

The "Check For Ready Items" step 900 in FIG. 7 occurs when a return customer is involved (i.e., the customer is found not to be new in preceding step 700 et. al.). Step 900 queries the conveyor and order tables in the database to determine if the customer identified in step 600 has items that are able to be delivered through the kiosk. The "Check conveyor table in database for ready orders" step 905 (FIG. 11) checks the conveyor table looking for orders that are ready for the identified customer. If no order is found in step 910, the routine returns to step 900. If an order is detected in the "Orders Found" step 910, i.e., if orders were located in the conveyor table for the identified customer, the "Check orders table to verify order is allowed to be picked up through kiosk" step 915 executes, wherein the orders table is queried and checked via the relationship with the conveyor table. The matching order is then checked to verify that the third part software will allow the order to be picked up through the kiosk in step 920. If the "Orders valid to be picked up, step 920 finds that none of the orders are authorized to be picked up, control is returned to the customer user interface 950, otherwise the "Orders Ready to be picked up" screen 922 is displayed and the customer is told that they have orders ready to be picked up and asks if they want to pick them up now. If they respond in step 924 with "no" or choose the "Express Drop Off" button, control is passed to the customer user interface step 950. If "yes" is selected, then the "Create command to pick up orders" step 925 follows, and the list of valid orders is generated and sorted based on the most efficient grouping to expedite off loading by the system. The off load commands are then placed in a queue to be processed by the system. The "Create pickup file for Third Party Software" step 930 creates a file and passes it to a third party software point of sale system, in a format that has been pre-agreed upon.

Referencing FIG. 7, in step 950, a routine checks to see whether or not the customer has selected "express drop off". If yes, control passes to the "Process Drop Off" routine, step 1200. If no, then in the "Display drop off screen" step 1000 a screen is displayed on the kiosk touch screen 12 asking the customer if they will be dropping off items for cleaning. The instructions are also read aloud to them through the use of the computer synthesized voice on speaker 16. In the "Dropping Off" step 1100 the customer responds to the drop off screen by touching the "Yes", "No", or "Express" button displayed on the touch screen. If the customer responds with a "no," then control is passed to step 1300 detailed below. If either a "yes" or "Express" is selected in step 1100, or if "Express" was selected in step 950, the "Process Drop Off Routing" step 1200 (FIG. 12) proceeds. Routine 1200 interacts with the customer to gather information about the order being dropped off, prints receipts and creates the necessary records needed for the transaction.

If in step 1210 (FIG. 12) it is determined that "Express" was selected, then control is passed to step 1250.

Figure 12:
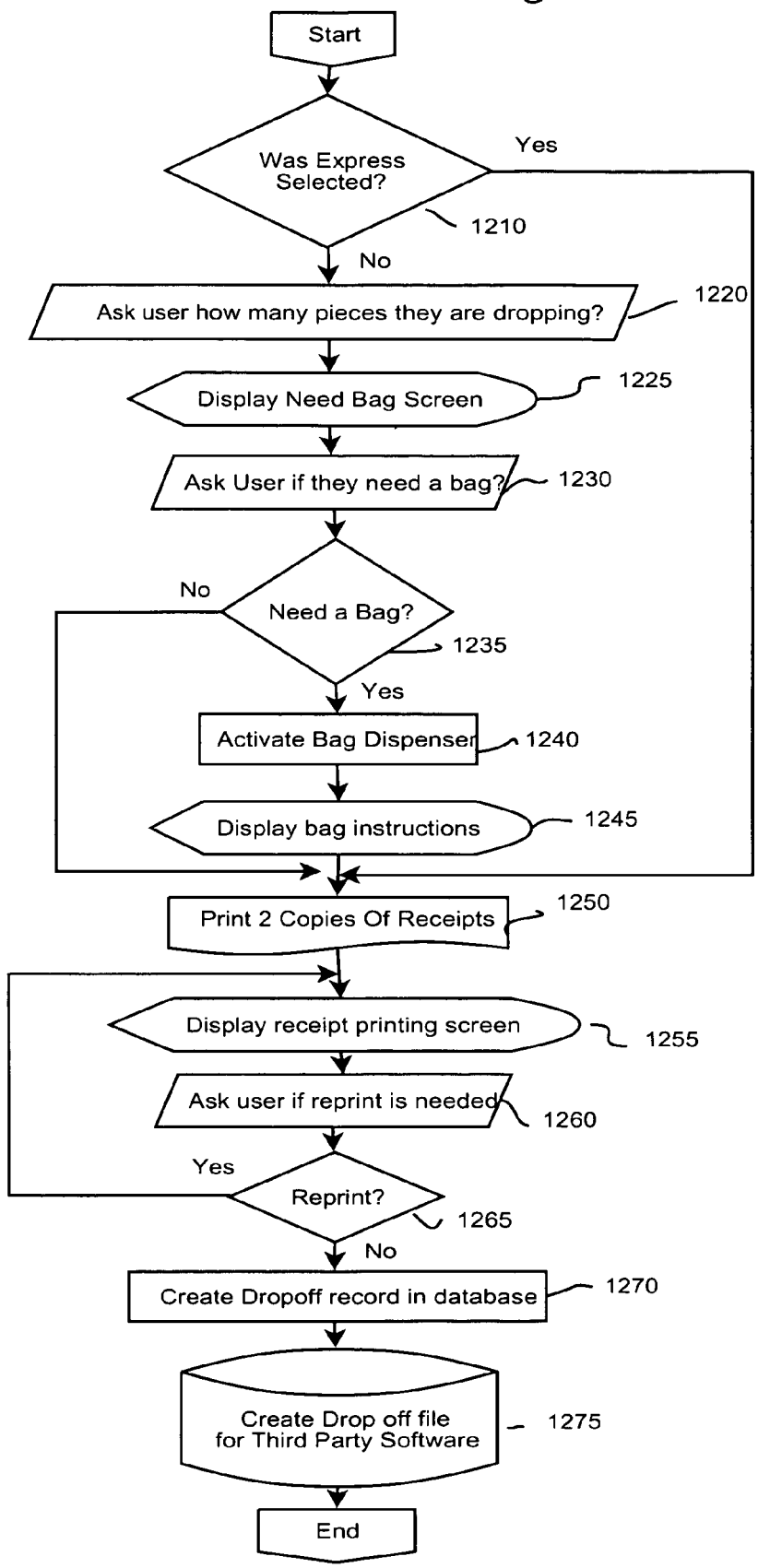

If in step 1210 (FIG. 12) it is determined that "Express" was not selected, then during the "Ask user how many items they are dropping off" step 1220, the kiosk touch screen 12 displays, and the speaker 16 verbally announces, asking how many items the customer/user will be dropping off. The customer then enters the number of items they are dropping off through an on screen keyboard. The customer presses "continue" to move to the "Display 'need a bag' screen" step 1225 (FIG. 12). The kiosk touch screen 12 displays a screen informing the customer that all items dropped off will need to be in a bag, and asks if they will need a bag. This information is also read verbally to the customer. In the succeeding "Ask user if they need a bag" step 1230, the user/customer will answer "yes" or "no" using the touch screen 12 and the indicated yes or no buttons. In step 1235, if they answer no, control is passed to step 1250, but if they answer "yes," the "Activate bag dispenser" step 1240 follows, sending a command to the kiosk's machine control unit PLC 31 (FIGS. 2 & 3) to dispense one bag from the bag vending device attached to the kiosk. The following "Display bag instructions" step 1245 (FIG. 12) causes the kiosk touch screen 12 to display a message informing the customer to place all items in a bag and to place the bag inside of the kiosk cabinet. In the "Print 2 copies of the receipt" step 1250 two copies of the receipt is printed via the kiosks' built-in printer. One copy is for the customer to keep for a record, the other copy is placed inside the bag with the items to identify the order to the third party software. The "Display receipt printing screen" step 1255 (FIG. 12) displays a screen on the kiosk's touch screen 12 informing the customer that receipts are being printed and instructing them to place one receipt in the bag and keep the other. The "Ask user if reprint is needed" step 1260 provides an option to print another copy of the receipt. The customer responds to the question in step 1265 via the touch screen and yes/no buttons. If they answer "yes" then control is passed back to step 1250. The "Create drop-off record in database" step 1270 follows if step 1265 results in a "no." In step 1270, a record is created in the drop-off table in the database containing the customer ID, the number of items they are dropping off, the date and time, promise date on the order and other miscellaneous information. The "Create drop-off file for third party software" step 1275 creates a file and passes it to a third party software point of sale (POS) system, in a format that has been pre-agreed upon. Step 1300, the "Finish Transaction" step, (FIG. 7) follows.

Figure 13:
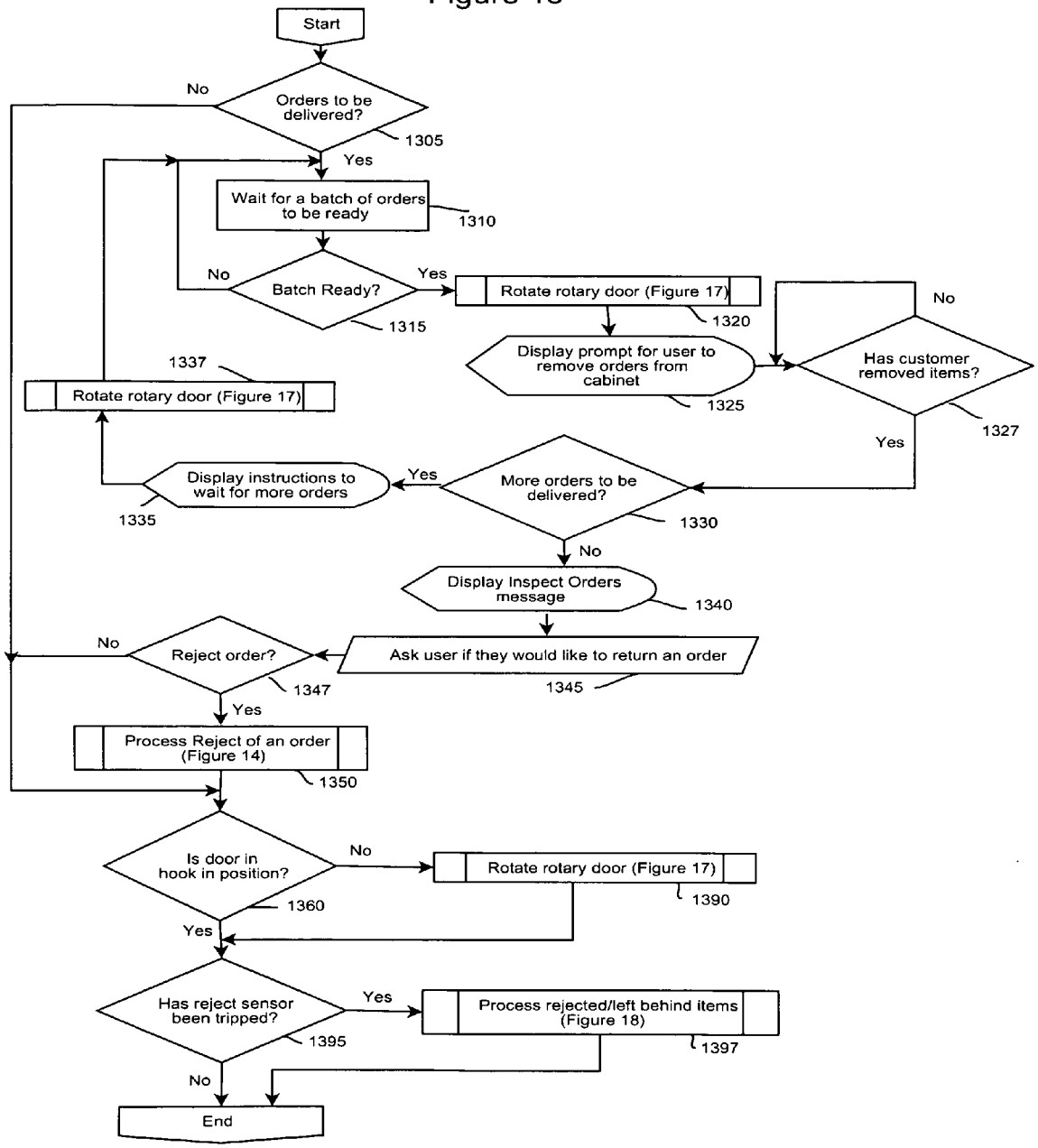

The "Finish transaction" step 1300 of FIG. 7 is detailed in FIG. 13. This routine delivers the completed orders to the customer, asks the customer if they would like to reject an order, and handles the reject operation. The "Orders to be delivered" step 1305 (FIG. 13) checks the results from step 900 (FIG. 7); if there are no orders to be delivered, control is passed to step 1360. If step 1305 determines that orders are ready to be delivered, then the commands are executed and sent to the machine control unit 31 (FIGS. 2 & 3) for retrieval.

Figure 17:
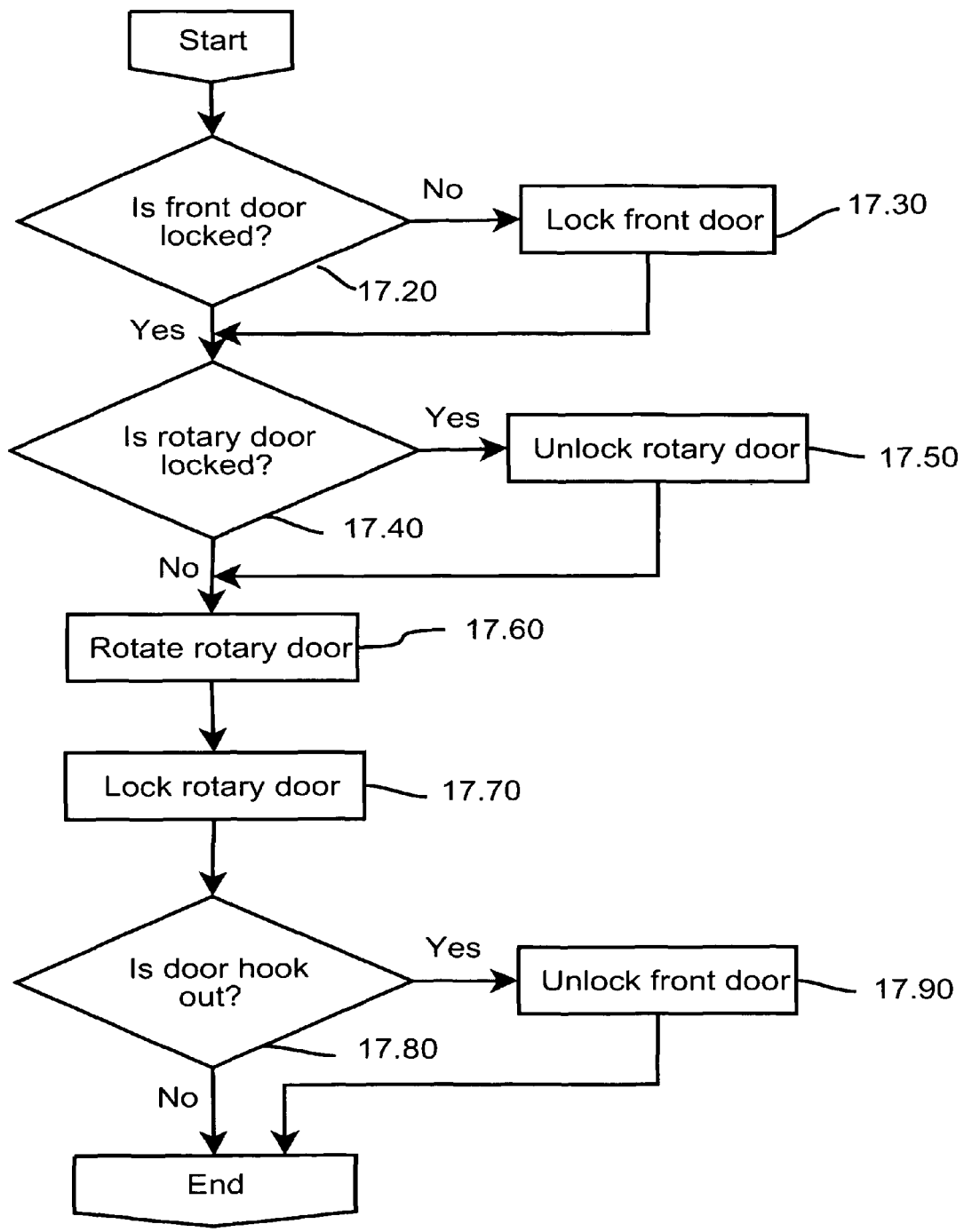

The "Wait for a Batch of Orders to be Ready" step 1310 organizes batches of cleaned garments. Orders are picked up in batches to accommodate the size of the pickup cabinet. Excessively large orders will be delivered in several successive batches. The "Batch ready" step 1315 checks a register in the machine control unit 31 (FIGS. 2 & 3) to see if a batch of orders is ready. If the batch is not ready, control is sent back to step 1310. If a batch is ready, the "Rotate rotary door" step 1320 which is detailed in FIG. 17 follows.

During the "Rotate rotary door" routine (FIG. 17), step 17.20 checks a register in the machine control unit PLC 31 (FIGS. 2 & 3) to determine if the kiosk's front door 11 (FIG. 1) is locked. If "yes", then control proceeds to step 17.40. If "No", then in step 17.30, a command is executed by the machine control unit 31 (FIGS. 2 & 3) to lock the front door. Then in step 17.40, a register in the machine control unit 31 (FIGS. 2 & 3) is checked to determine if the rotary door 35 (Fig.5) is locked. If "No", then control proceeds to step 17.60. If "Yes", then a command is executed in step 17.50 by the machine control unit 31 (FIGS. 2 & 3) to unlock the rotary door. In step 17.60, a command is executed by the machine control unit 31 (FIGS. 2 & 3) to rotate the rotary door, then is step 17.70 a command is executed by the machine control unit 31 to lock the rotary door. Then in step 17.80, a register in the machine control unit is checked to determine if the rotary door is in the "hook-out" position. If "No", then control passes to step 1325 (FIG. 13). If "Yes", then in step 17.90 a command is executed by the machine control unit 31 (FIGS. 2 & 3) to unlock the front door before proceeding to step 1325 (FIG. 13).

Next, referencing FIG. 13, step 1325 entitled "Display prompt for user to remove orders from cabinet," follows, and the kiosk's touch screen 12 (FIG. 1) displays a message telling the user/customer to open the front door 11, reach in and remove their order, and then press the "continue" button. Then in step 1327, a routine checks to determine if the customer has removed the items from the kiosk. The routine repeats until that is confirmed, and then the "More orders to be delivered" step 1330 checks to see if all orders for that customer have been delivered, or if more orders remain. If more orders remain then the commands are sent to the machine control unit 31 (FIGS. 2 & 3) to extract and deliver the next batch or orders and control is passed to step 1335, otherwise control goes to step 1340. In step 1335 (FIG. 13) the kiosk's touch screen 12 (FIG. 1) displays an instruction, and the speaker 16 (FIG. 1) verbally announces, that the customer should wait for the next batch of orders that will be delivered, control passes to step 1337 and the rotate rotary door routine runs per the steps previously described in FIG. 17, then control is returned to step 1310. In step 1340 the customer is visually and audibly instructed to inspect all of their orders via touch screen 12 and the speaker 16 (FIG. 1) respectively. The customer is then asked if they would like to return or reject any of their orders in step 1345.

Figure 14:
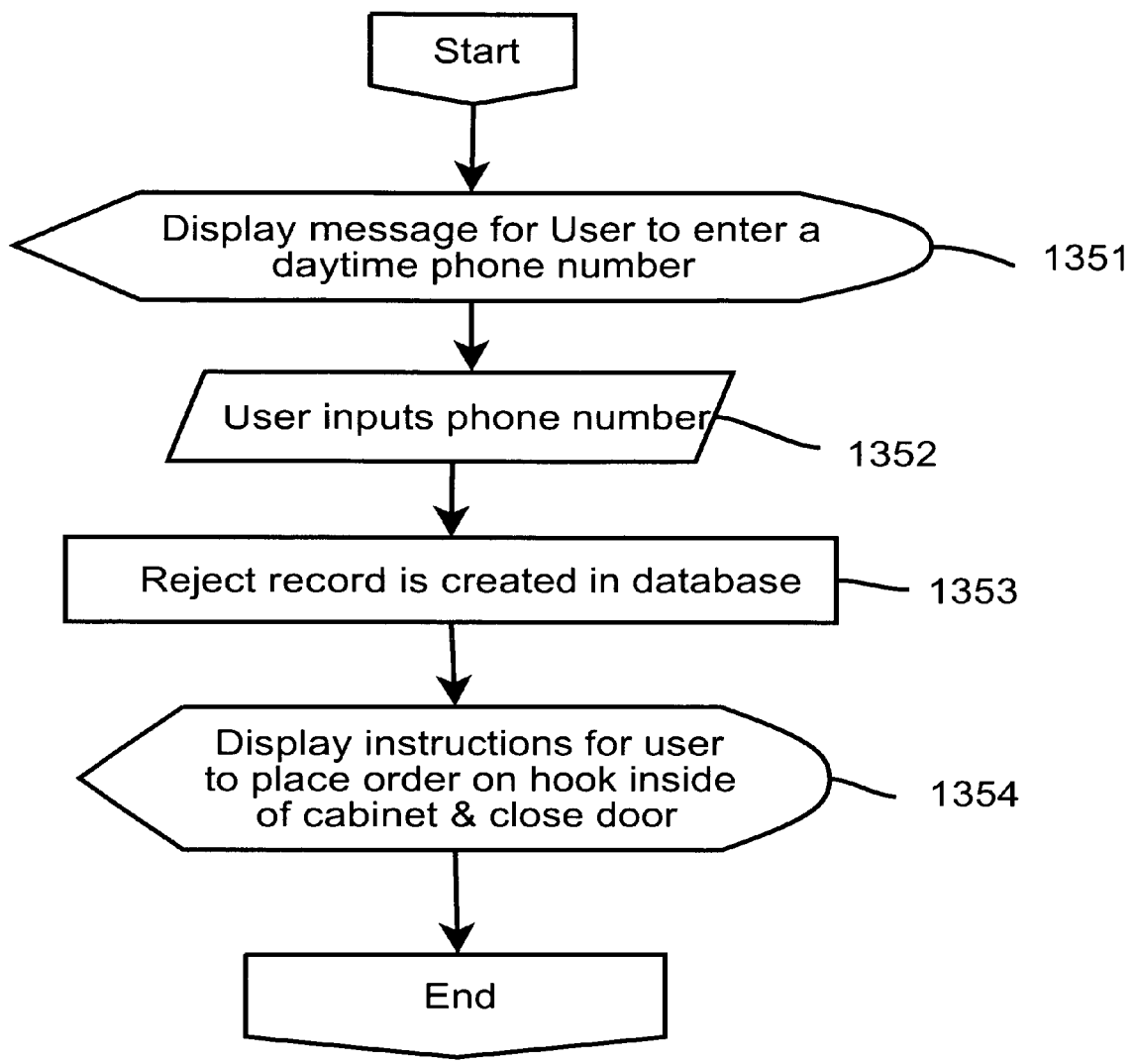

The "Reject order" step 1347 (FIG. 13) requires the customer to indicate a "yes" or "no" by pressing corresponding buttons on the kiosk's touch screen 12. If the answer is "no," then control is passed to step 1360. If the answer is "yes", and an order is to be rejected, the "Process reject of an order" step 1350 runs. Referencing FIG. 14, the "Display message for user to enter a daytime phone number" step 1351 causes the kiosk touch screen to display instructions for the customer/user to enter a daytime phone number. The latter instruction is announced orally on speaker 16. The "User inputs phone number" step 1352 instructs the customer to input a phone number through the kiosk's touch screen and on screen number pad. The customer chooses "continue" on the touch screen display when done entering the requested phone number. In the "Reject record is created in database" step 1353 a record is created in the "rejects table" in the database. This record contains the customer ID, phone number, date and time of the transaction and other miscellaneous information. The "Display instructions for user to place order on hook inside of cabinet and close door" step 1354 is facilitated by the touch screen display and verbal system, presenting instructions for the customer to place the order they are returning inside the cabinet on the hook, close the door, and then press the continue button on the screen 12. The routine is then complete and control passes to step 1360 where a routine runs to check whether or not the rotary door 35 (FIG. 5) is in the hook-in position. If "yes", control is passed to step 1395. If "no", then the rotate rotary door routine, step 1390 (FIG. 17) is executed, then control is passed to step 1395. In step 1395, a routine checks to determine if the rejected clothes sensor 33 (FIG. 5) has been tripped. If "No", control is passed to step 1400 (FIG. 7). If "Yes", step 1397 process rejected/left behind orders routine (FIG. 18) is run.

Figure 18:
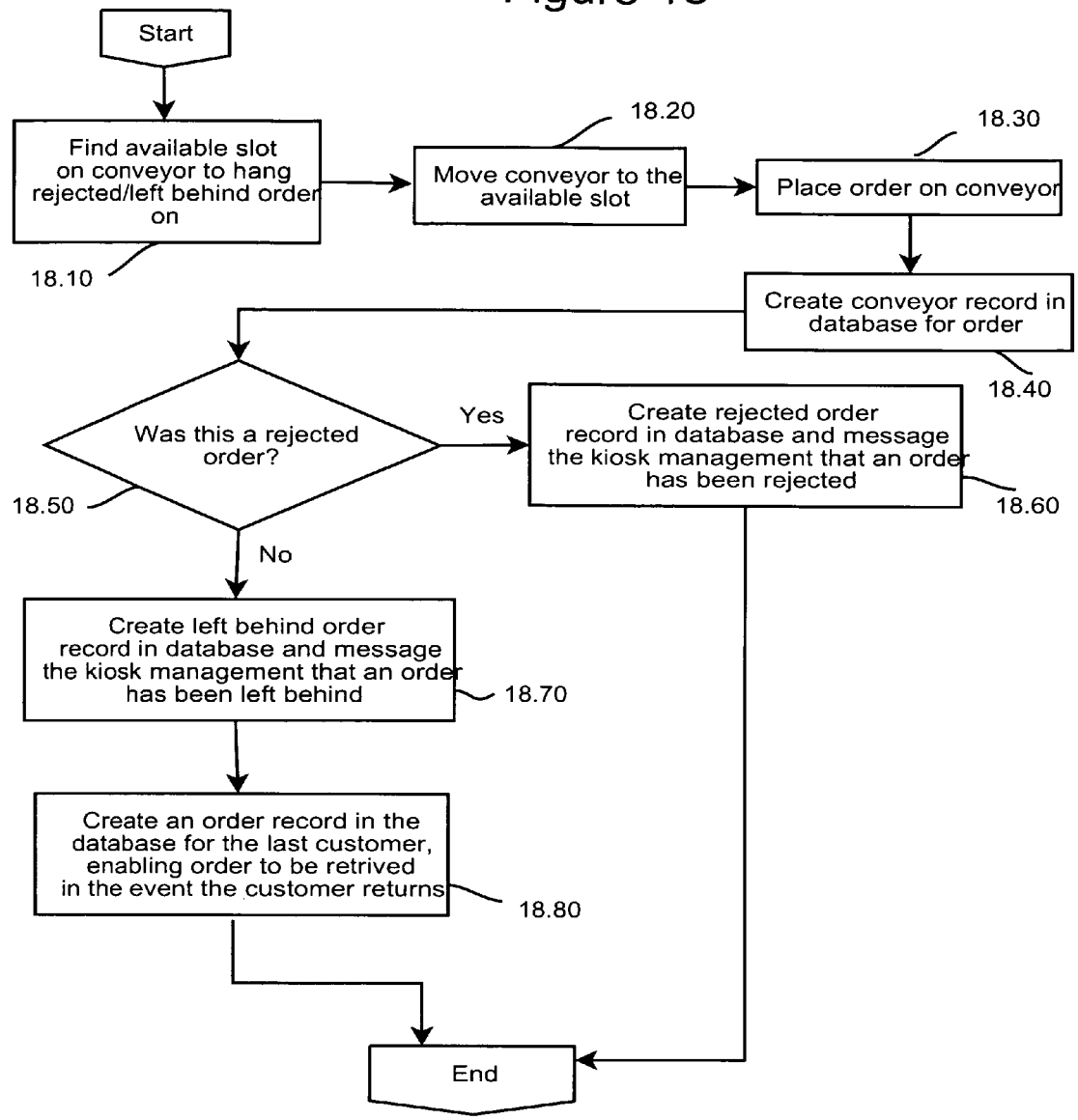

In FIG. 18, the Process Rejected/Left Behind Orders routine begins with step 18.10 in which an available slot on a hanger bracket 47 (FIG. 4) on the electric storage conveyor 48 (FIGS. 4, 5 & 6) is found on which to hang the rejected/left behind order. Then in step 18.20, the machine control unit PLC 31 (FIGS. 2 & 3) moves the electric storage conveyor to position that available slot at a point where it can be loaded by the garment transfer unit 38 (FIG. 5). Then in step 18.30, the garment transfer unit removes the rejected/left behind order from the delivery hook 52 (FIG. 5) and places it onto the available hanger bracket slot on the conveyor. A record is then created in the database in step 18.40 for the order and slot number. Then in step 18.50, a routine is run to determine if the order was a rejected order (per step 1347, FIG. 13). If "Yes", a rejected order record is created in the database in step 18.60 and a message is sent to kiosk management that an order has been rejected. Control then passes to step 1400 (FIG. 7) where a finish screen is displayed on the touch screen monitor 12 (FIG. 1). If "No", then in step 18.70 a left behind order message is created in the database and a message is sent to kiosk management that an order has been left behind by a customer. An order record is then created in the database for the last customer to use the system in step 18.80 enabling the order to be retrieved again in the event the customer returns to do so. The routine is then complete and control then passes to step 1400 (FIG. 7) where a finish screen is displayed on the touch screen monitor 12 (FIG. 1).

After checking registers on the machine control unit 31 (FIGS. 2 & 3) to verify that the door is closed and locked, audible "thank you" message is played and control is sent to step 100.

Load Station User Interface

Figure 15:
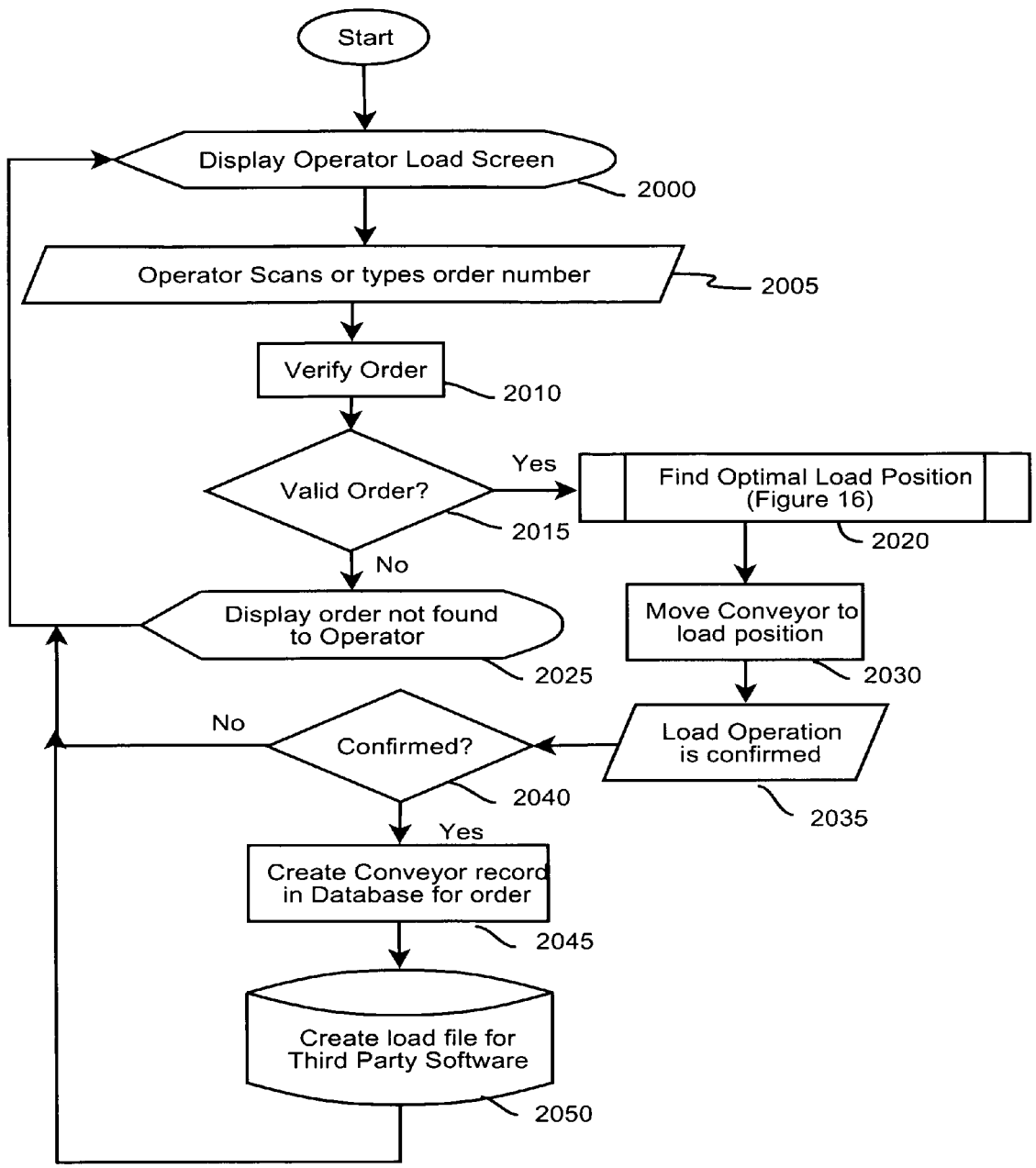

The load station consists of a secondary computer monitor 20 (FIG. 4) which is touch screen enabled. A serial barcode scanner 21 is used as an input device to supplement the touch screen. Operation commences with the "Display operator load screen" step 2000 (FIG. 15). The main load station User Interface (UI) screen is displayed on the monitor 20 (FIG. 4). This screen has an input box allowing for the entry of an order number. The "Operator scans or types order number" step 2005 (FIG. 15) allows the order number to be entered using the onscreen number pad, or scanned using the attached serial scanner. The "Verify order" step 2010 compares the order number entered in step 2005 against the orders table in the database. The "Valid order?" step 2015 looks for an order entry corresponding to that found in the database in step 2010, and control is sent to step 2020, otherwise control is passed to 2025.

The "Find optimal load position" step 2020 insures maximum time efficiency by arranging delivery of orders for the same customers as close together as possible. This is determined through the algorithm of FIG. 16.

Figure 16:
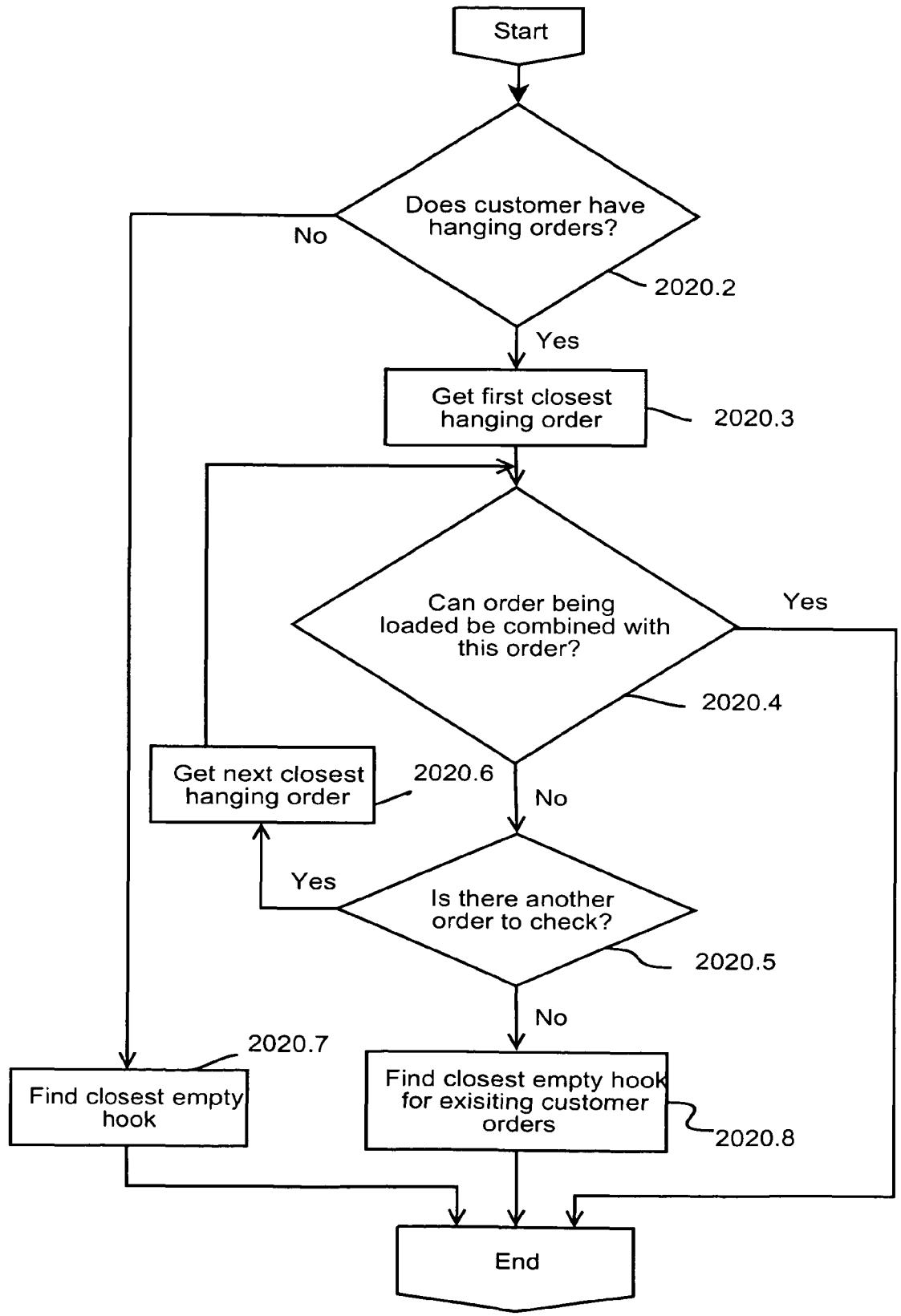

In FIG. 16, a routine in step 2020.2 determines if the customer who owns the order that was just entered has any other orders already hanging on the conveyor. If no, the nearest empty slot (or hook) is assigned to the order in step 2020.7. If yes, then the nearest hanging order is determined in step 2020.3 and then in step 2020.4 a routine runs to determine if there is an empty slot next to the order found in step 2020.3 If yes, then that slot is assigned to the order being loaded. If not, another routine runs in step 2020.5 to determine if there are additional orders belonging to the same customer that are already hanging on the conveyor. If yes, then in step 2020.6 the nearest of those orders is determined and control is passed back to step 2020.4. If no, then in step 2020.8 the closest empty slot on the conveyor is determined and is assigned to the order being loaded. Control then returns to step 2030 (FIG. 15).

The target load position is displayed on the load station monitor. Control is then passed to the "Move conveyor to load position" step 2030 that issues a command to the machine control unit 31 (FIGS. 2 & 3) to rotate the conveyor to the correct load position. This is done by moving the conveyor in the direction that yields the shortest travel distance. The operator confirms the load operation in step 2035, i.e., the operator is given the choice of loading and confirming the placement of the order, or manually entering a new location and confirming the new location. Placement of the order onto the conveyor is confirmed either by a sensor located on the load shroud 42 (FIG. 4), or by the operator pressing a confirmation button on the load station touch screen monitor 20 (FIG. 4).

In the event a new location is selected by the operator, a command is sent to the machine control unit 31 (FIGS. 2 & 3) to rotate the conveyor to the new position. If step 2040 confirms a "yes", steps 2045 and 2050 follow, otherwise the program returns to step 2000.

If no order was found in step 2015, the "Display order not found to Operator" step 2025 provides a message displayed to the operator that the order was not found, and requests that he or she please retry. Control is then passed to step 2000, which results in rescanning and another verification attempt.

The "Create conveyor record in database for order" step 2045 (FIG. 15) creates a record in the conveyor table in the database for the order. The location, order number, time of load, customer ID and other miscellaneous information is contained in this record. Finally, the "Create load file for Third Party Software" step 2050 creates a file and passed it to a third party software point of sale system, in a format that has been pre-agreed upon. Control is then passed back to step 2000.

Garment Transfer Unit

Figure 19:
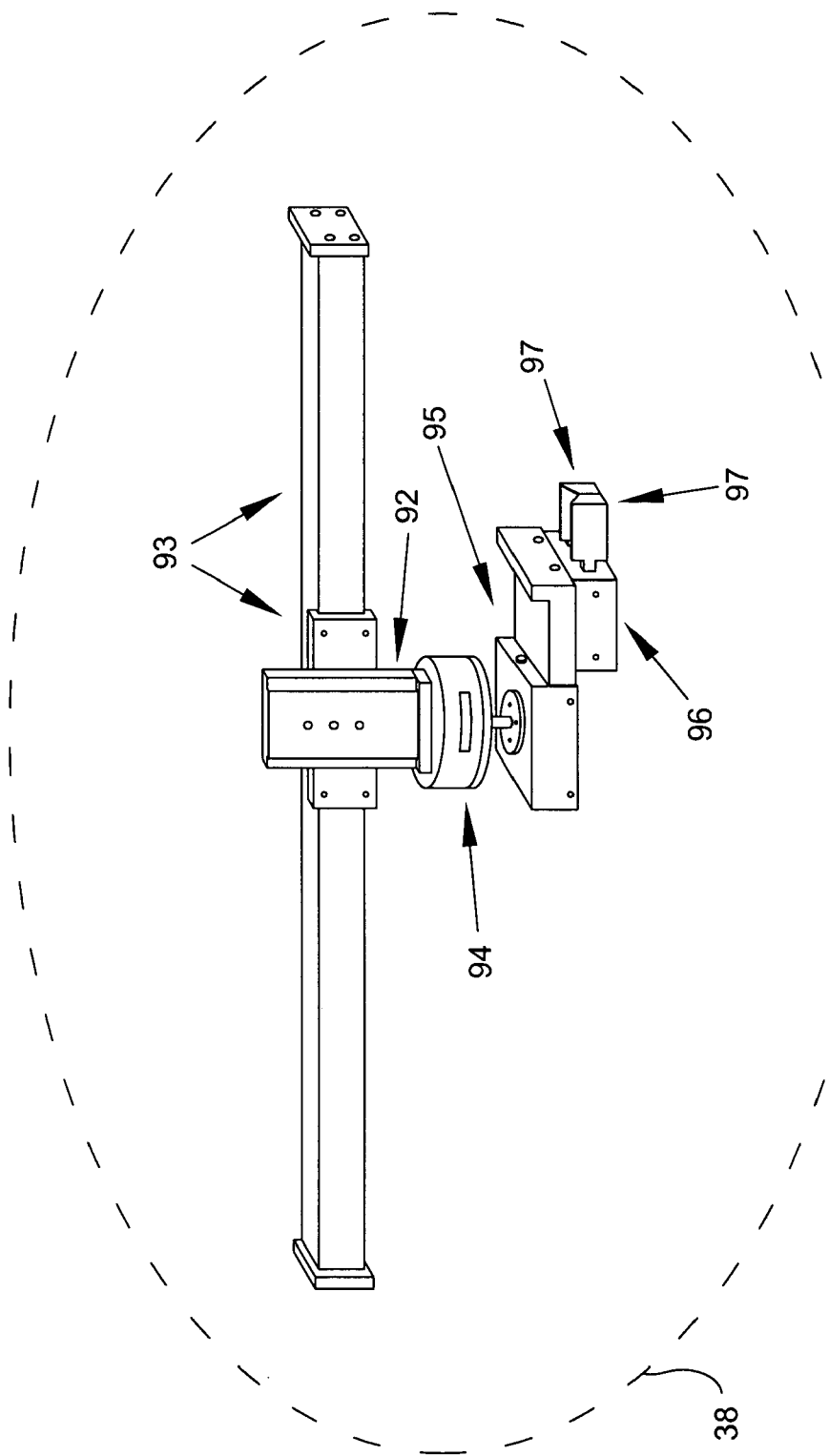
FIG. 19 is a pictorial view of the garment transfer unit that transfers cleaned customer orders from the storage conveyor to the kiosk delivery hook as well as from the kiosk delivery hook back to the storage conveyor; and, FIGS. 20-21 are flow charts of the steps used by the garment transfer unit when transferring garments.

The garment transfer unit 38 is depicted in FIG. 19 and consists of a vertical actuator 92, horizontal actuator 93, rotary actuator 94, reach actuator 95, angular gripper 96, and two gripper fingers 97. Each of these components may be either pneumatic or electric.

Figure 20:
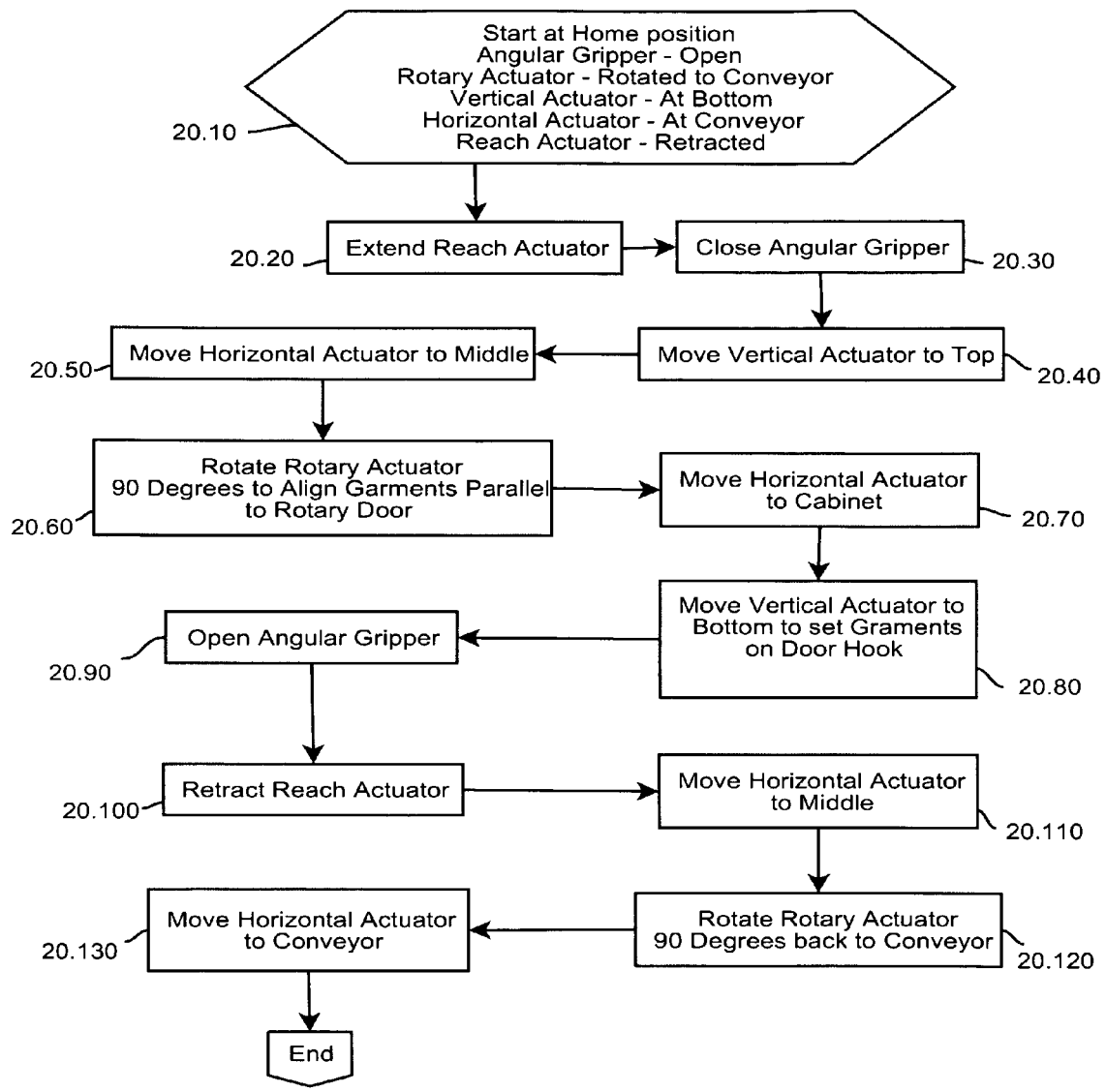

In FIG. 20, when transferring orders from the electric garment storage conveyor 48 (FIG. 5) to the rotary door order delivery hook 52 (FIG. 5), the garment transfer unit is first positioned to the home position step 20.10 with the angular gripper 96 open, rotary actuator 94 is rotated so as to align the gripper fingers 97 perpendicularly with the storage conveyor 48 (FIG. 5), vertical actuator at it's bottom position, horizontal actuator 93 at its most forward position and reach actuator 95 retracted. The reach actuator 95 is then extended in step 20.20, and the angular gripper 96 is closed in step 20.30 to grip the neck of the garment hangers containing the order in the conveyor bracket 47 (FIG. 4) slot, the vertical actuator 92 is moved to its top position in step 20.40 to lift the hangers out of the slot and the horizontal actuator 93 is then moved to its middle position in step 20.50 pulling the order away from the conveyor 48 (FIGS. 4 & 5). The rotary actuator 94 is then rotated 90 degrees in step 20.60 to align the order so that it's parallel to the rotary door 35 (FIG. 5). The horizontal actuator 93 is then moved to its most reverse position (closest to the kiosk cabinet 54 (FIG. 5)) in step 20.70. The vertical actuator 92 is then moved to its bottom position in step 20.80, setting the order's garment hanger hook(s) on the rotary door order delivery hook 52 (FIG. 5). The angular gripper 96 is open in step 20.90 to release the garment hangers, then the reach actuator is retracted in step 20.100 to move the gripper fingers 97 clear of the garment hangers. The horizontal actuator 93 is then moved back to its middle position in step 20.110, then the rotary actuator 94 is rotated 90 degrees in step 20.120 to position the gripper fingers perpendicular to the garment storage conveyor 48 (FIG. 5), and the finally in step 20.130 the horizontal actuator 93 is moved to its most forward position in order to complete the return of the garment transfer unit to its home position.

Figure 21:
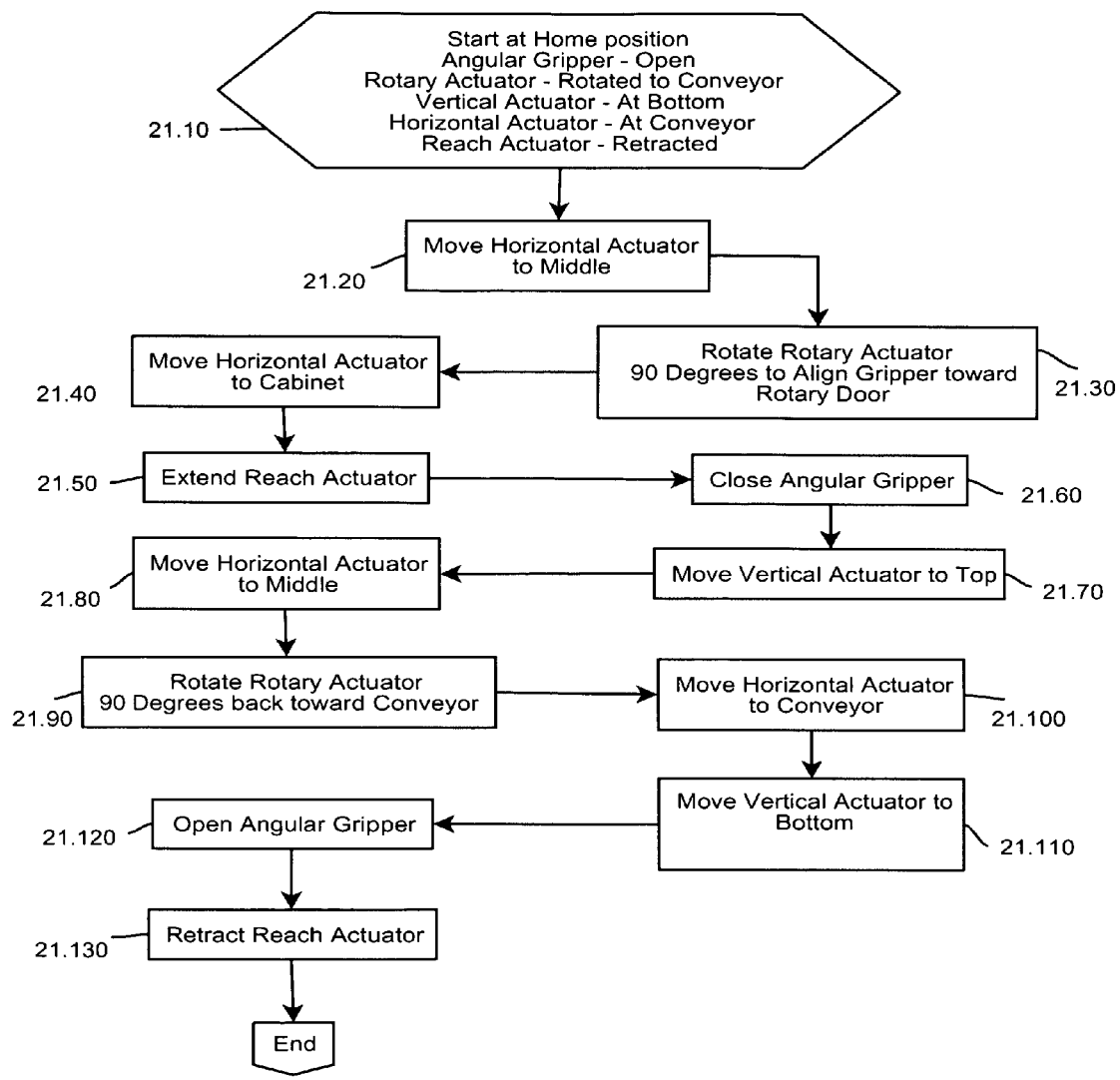

In FIG. 21, when transferring orders from the rotary door order delivery hook 52 (FIG. 5) to the electric garment storage conveyor 48 (FIG. 5), the garment transfer unit is first positioned to the home position step 20.10 with the angular gripper 96 open, vertical actuator at it's bottom position, rotary actuator 94 is rotated so as to align the gripper fingers 97 perpendicularly with the storage conveyor 48 (FIG. 5), the horizontal actuator 93 at its most forward position and reach actuator 95 retracted. The horizontal actuator 93 is then moved to its middle position in step 21.20, then in step 21.30 the rotary actuator 94 is rotated 90 degrees to align the gripper fingers to be parallel with the rotary door 35 (FIG. 5). The horizontal actuator 93 is then moved to its most reverse position (closest to the kiosk cabinet 54 (FIG. 5)) in step 21.40 and then is step 21.50 the reach actuator 19 is extended. Then in step 21.60 the angular gripper 96 is closed so that the gripper fingers 97 grip the neck of the garment hanger(s) containing the order and then the vertical actuator 19 is moved to its top position in step 21.70 to lift the garment order off the rotary door order delivery hook 52 (FIG. 5). Then in step 21.80 the horizontal actuator is moved to its middle position and then the rotary actuator 94 is rotated 90 degrees in step 21.90 to align the garment order perpendicularly to the garment storage conveyor 48 (FIG. 5).

The horizontal actuator 93 is then moved to its most forward position in step 21.100 and the vertical actuator 92 is then moved in step 21.110 to its bottom position. The garment order's hanger(s) are then released onto the storage conveyor hanger bracket slot when the angular gripper 96 is opened in step 21.120. The reach actuator is then retracted in step 21.130 to return the garment transfer unit to its home position, thus completing the process.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. An automated self-service dry cleaning and laundry drop-off and retrieval system for use by a dry cleaning establishment for receiving and returning goods to be laundered, the system comprising:
   a system computer;
   an upright kiosk for both receiving goods dropped off by customers and returning processed goods back to customers, the kiosk comprising:
      an external access door through which customers drop off items for cleaning or retrieve items that have already been cleaned;
      an internal rotary door for transferring goods through said kiosk within said dry cleaning establishment, the internal door supporting a delivery hook for holding items;
      a touch screen display monitor for displaying customer options and recognizing customer selection inputs;
      a card reader for identification and facilitating financial and identification transactions;
      a printer for preparing customer receipts; and,
      means for assigning dropped off goods a unique order number and transferring the number to said computer;
   a conveyor within said establishment proximate said kiosk for storing goods and delivering cleaned goods to said kiosk for customer pick-up;
   a customer user interface program adapted to run on said computer that is responsive to said touch screen monitor;
   means for scanning goods transferred through said kiosk into said establishment;
   the conveyor within said establishment comprising a plurality of garment hanging racks for supporting hangers with items attached;
   garment transfer means for transferring items both from the conveyor to the delivery hook and, in the case of customer-rejected or forgotten items, from the delivery hook back to the conveyor;
   means of loading processed items onto the conveyor by an operator through a load station for assignment of location and tracking for later retrieval;
   wherein a program executes the following steps:
      (a) executing a display welcome screen on said touch screen display prompting the customer to press a start button on the computer touch screen or to swipe a magnetic card in the card reader;
      (b) executing a "Wait for card swipe" step to monitor the magnetic card reader for a valid customer input, and if not, returning to the welcome screen;
      (c) if a valid card input is detected, processing Card Swipe information, then prompting the customer for their phone number and looking up the customer in a database, or, if a new phone number is determined, obtaining new customer information;
      (d) executing a "Check for Ready Items" step to determine if a valid order for this customer is ready for delivery, and, if so, delivering the order to the customer through said access door;
      (e) executing a process drop off step if the customer indicates they have items to be dropped off by prompting the customer to enter details about the order, then processing the order by assigning a unique order number, printing receipts and transferring the order number through the kiosk; and,
      (f) executing a finish transaction step by determining if the customer wishes to reject a delivered order, and, if so, opening the access door to allow the rejected order to be reprocessed, and if not, returning to said step (a).

2. The automated self-service dry cleaning and laundry drop-off and retrieval system as defined in claim 1 further comprising a dispenser accessible from said kiosk for vending disposable bags for customers.

3. The automated self-service dry cleaning and laundry drop-off and retrieval system as defined in claim 1 further comprising audio feedback means for audibly assisting customers.

4. The automated self-service dry cleaning and laundry drop-off and retrieval system as defined in claim 1 further comprising means for locking the rotary door whenever the access door is opened.

5. The automated self-service dry cleaning and laundry drop-off and retrieval system as defined in claim 1 wherein the kiosk comprises a rotary door for discharging dropped off items from said kiosk and a clothes drop ram for further moving dropped off items away from kiosk.

6. The automated self-service dry cleaning and laundry drop-off and retrieval system as defined in claim 5 further comprising a front door sensor for detecting whether the access door is open or closed.

7. The automated self-service dry cleaning and laundry drop-off and retrieval system as defined in claim 5 further comprising a returned item sensor for detecting the presence of customer-rejected or forgotten items on said transfer hook, and wherein the computer program allows customers the choice to return rejected items by placing them back inside said kiosk.

8. The automated self-service dry cleaning and laundry drop-off and retrieval system as defined in claim 7 wherein each conveyor hanger bracket comprises internal V-shaped slots causing garment hangers to assume a stable middle position within the bracket slot.

9. The automated self-service dry cleaning and laundry drop-off and retrieval system as defined in claim 1 wherein said step 1(b) comprises the further steps of:
  (a) testing for a valid swipe by parsing magnetic track data from the card reader and checking for the validity of the input by determining if the magnetic card data is corrupt or in an incompatible format;
  (b) if the swipe is invalid as determined in the preceding step, setting an error condition and passing control back to the customer user interface and if the swipe is valid Parsing Magnetic Data for information including card number, expiration date and the card holder name; and,
  (c) determining if a loyalty card is in use, and, if so , storing the loyalty card number and passing control back to the customer user interface, and if not, executing a "Return Customer Name" step to store customer name data from the magnetic stripe and passing back to the customer user interface.

10. The automated self-service dry cleaning and laundry drop-off and retrieval system as defined in claim 1 wherein if step 1(f) determines that an order has been rejected, executing the further steps of:
  (a) executing a "Process reject of an order" step and creating a "Reject record" Containing the customer ID, phone number, date and time of the transaction;
  (b) executing a "Display instructions for user to place order on hook inside of cabinet and close door" step by interfacing the touch screen display, presenting instructions for the customer to place the order they are returning on the delivery hook, and closing the access door; and,
  (c) transferring the rejected order through the kiosk to the establishment interior for processing.

11. The automated self-service dry cleaning and laundry drop-off and retrieval system as defined in claim 1 wherein items forgotten and left behind within the kiosk by a customer are removed and made available for customer retrieval again by execution of the following steps:
  (a) detecting any items left on the delivery hook;
  (b) determining if items were rejected by the last customer, and if not,
  (c) creation of a left behind order record
  (d) assigning an available slot on the storage conveyor for a forgotten order
  (e) transferring the items from the delivery hook to said slot; and,
  (f) creating an order record for the last customer who used the kiosk, enabling the order to be retrieved by that customer in the event he/she returns.

12. An automated self-service dry cleaning and laundry drop-off and retrieval system for use by a dry cleaning establishment for receiving and returning goods to be laundered, the system comprising:
  a system computer;
  an upright kiosk for both receiving goods dropped off by customers and returning processed goods back to customers, the kiosk comprising:
    an external access door through which customers drop off items for cleaning or retrieve items that have already been cleaned;
    an internal rotary door for transferring goods through said kiosk within said dry cleaning establishment, the internal door comprising a delivery hook for holding items;
    a touch screen display monitor for displaying customer options and recognizing customer selection inputs;
    a card reader for identification and facilitating financial transactions;
    a printer for preparing customer receipts;
    means for assigning dropped off goods an unique order number and transferring the number to said computer;
    a dispenser accessible from said kiosk for vending disposable bags for customers;
    a clothes drop ram for discharging dropped off items or forgotten items from said kiosk through said rotary door;
    a door sensor for detecting whether the access door is open or closed;
    a returned item sensor for detecting the presence of customer-rejected items on said transfer hook;
  a conveyor within said establishment proximate said kiosk for storing goods and delivering cleaned goods to said kiosk for customer pick-up;
  a customer user interface program adapted to run on said computer that is responsive to said touch screen monitor;
  means for scanning goods transferred through said kiosk into said establishment;
  the conveyor within said establishment for handling goods comprising a plurality of garment hanging racks for supporting hangers with items attached;
  garment transfer means for transferring items between said delivery hook and said conveyor, the garment transfer means responsive to said program for recognizing the customer order number so that the order can be properly loaded onto said conveyor;
  wherein the program executes the following steps:
    (a) executing a display welcome screen on said touch screen display prompting the customer to press a start button on the computer touch screen or to swipe a magnetic card in the card reader;
    (b) executing a "Wait for card swipe" step to monitor the magnetic card reader for a valid customer input, and if not, returning to the welcome screen;
    (c) if a valid card input is detected, processing Card Swipe information by prompting the customer for their phone number and looking up the customer in a database, or, if a new phone number is determined, obtaining new customer information;
    (d) executing a "Check for Ready Items" step to determine if a valid order for this customer is ready for delivery, and, if so, delivering the order to the customer through said access door;

(e) executing a process drop off step if the customer indicates they have items to be dropped off by prompting the customer to enter details about the order, then processing the order by assigning a unique order number, printing receipts and transferring the order number through the kiosk; and, (f) executing a finish transaction step by determining if a customer wishes to reject a delivered order, and, if so, opening the access door to allow the rejected order to be reprocessed, and if not, returning to said step (a).

13. The automated self-service dry cleaning and laundry drop-off and retrieval system as defined in claim 12 further comprising audio feedback means for audibly assisting customers.

14. The automated self-service dry cleaning and laundry drop-off and retrieval system as defined in claim 12 further comprising means for locking the rotary door whenever the access door is opened.

15. The automated self-service dry cleaning and laundry drop-off and retrieval system as defined in claim 14 wherein each conveyor hanger bracket comprises internal V-shaped slots causing garment hangers to assume a stable middle position within the bracket slot.

16. The automated self-service dry cleaning and laundry drop-off and retrieval system as defined in claim 14 wherein said step 12(b) comprises the further steps of:

(a) testing for a valid swipe by parsing magnetic track data from the card reader and checking for the validity of the input by determining if the magnetic card data is corrupt or in an incompatible format;

(b) if the swipe is invalid as determined in the preceding step, setting an error condition and passing control back to the customer user interface and if the swipe is valid Parsing Magnetic Data for information including card number, expiration date and the card holder name;

(c) determining if a loyalty card is in use, and, if so, storing the loyalty card number and passing control back to the customer user interface, and if not, executing a "Return Customer Name" step to store customer name data from the magnetic stripe and passing back to the customer user interface.

17. The automated self-service dry cleaning and laundry drop-off and retrieval system as defined in claim 12 wherein if step 12(f) determines that an order has been rejected, executing the further steps of:

(a) executing a "Process reject of an order" step and creating a "Reject record" Containing the customer ID, phone number, date and time of the transaction;

(b) executing a "Display instructions for user to place order on hook inside of cabinet and close door" step by interfacing the touch screen display, presenting instructions for the customer to place the order they are returning on the delivery hook, and closing the access; door;

(c) transferring the rejected order through the kiosk to the establishment interior for processing.

18. The automated self-service dry cleaning and laundry drop-off and retrieval system as defined in claim 17 wherein items forgotten and left behind within the kiosk by a customer are removed and made available for customer retrieval again by execution of the following steps:

(g) detecting any items left on the delivery hook;

(h) determining if items were rejected by the last customer, and if not, (i) creation of a left behind order record (j) assigning an available slot on the storage conveyor for a forgotten order;

(k) transferring the items from the delivery hook to said slot; and, (l) creating an order record for the last customer who used the kiosk, enabling the order to be retrieved by that customer in the event he/she returns.

* * * * *